US 12,473,579 B2

(12) United States Patent
Baba et al.

(10) Patent No.: US 12,473,579 B2
(45) Date of Patent: Nov. 18, 2025

(54) METHOD FOR ENZYMATICALLY PRODUCING MAYTANSINOL

(71) Applicant: MicroBiopharm Japan Co., Ltd., Tokyo (JP)

(72) Inventors: Yutaro Baba, Tokyo (JP); Kenji Nishimura, Tokyo (JP); Yuta Miki, Tokyo (JP); Yukie Kawasaki, Tokyo (JP); Tsuyoshi Yamamoto, Tokyo (JP); Mayu Kawasaki, Shizuoka (JP); Shogo Nakano, Shizuoka (JP); Sohei Ito, Shizuoka (JP)

(73) Assignee: MICROBIOPHARM JAPAN CO., LTD., Tokyo (JP)

( * ) Notice: Subject to any disclaimer, the term of this patent is extended or adjusted under 35 U.S.C. 154(b) by 587 days.

(21) Appl. No.: 17/779,967

(22) PCT Filed: Nov. 27, 2020

(86) PCT No.: PCT/JP2020/044347
§ 371 (c)(1),
(2) Date: May 25, 2022

(87) PCT Pub. No.: WO2021/107133
PCT Pub. Date: Jun. 3, 2021

(65) Prior Publication Data
US 2023/0030526 A1  Feb. 2, 2023

(30) Foreign Application Priority Data
Nov. 29, 2019  (JP) ................ 2019-217460

(51) Int. Cl.
*C12P 17/18*  (2006.01)
*C12N 9/18*  (2006.01)
(52) U.S. Cl.
CPC .............. *C12P 17/188* (2013.01); *C12N 9/18* (2013.01); *C12Y 301/01* (2013.01)
(58) Field of Classification Search
CPC ......... C12P 17/188; C12N 9/18; C12N 15/70; C12Y 301/01; C12Y 301/01001; C12R 2001/125
See application file for complete search history.

(56) References Cited

U.S. PATENT DOCUMENTS

| | | | |
|---|---|---|---|
| 6,333,410 B1 | 12/2001 | Chari et al. | |
| 9,029,107 B2 * | 5/2015 | Kawabata | C12N 9/14 435/320.1 |
| 2013/0096339 A1 | 4/2013 | Asuma et al. | |
| 2013/0130338 A1 | 5/2013 | Kawabata et al. | |

FOREIGN PATENT DOCUMENTS

| | | |
|---|---|---|
| JP | 85529972 A | 3/1980 |
| JP | 2004526734 A | 9/2004 |
| JP | 2009514978 A | 4/2009 |
| WO | 0216368 A1 | 2/2002 |
| WO | 02074775 A1 | 9/2002 |
| WO | 2007056550 A2 | 5/2007 |
| WO | 2011102388 A1 | 8/2011 |
| WO | 2012029819 A1 | 3/2012 |

OTHER PUBLICATIONS

Broun et al., Catalytic plasticity of fatty acid modification enzymes underlying chemical diversity of plant lipids. Science, 1998, vol. 282: 1315-1317. (Year: 1998).*
Chica et al., Semi-rational approaches to engineering enzyme activity: combining the benefits of directed evolution and rational design. Curr. Opi. Biotechnol., 2005, vol. 16: 378-384. (Year: 2005).*
Devos et al., Practical limits of function prediction. Proteins: Structure, Function, and Genetics. 2000, vol. 41: 98-107 (Year: 2000).*
Seffernick et al., Melamine deaminase and Atrazine chlorohydrolase: 98 percent identical but functionally different. J. Bacteriol., 2001, vol. 183 (8): 2405-2410. (Year: 2001).*
Sen et al., Developments in directed evolution for enzyme functions. Appl. Biochem. Biotechnol., 2007, vol. 143: 212-223. (Year: 2007).*
Whisstock et al., Prediction of protein function from protein sequence. Q. Rev. Biophysics., 2003, vol. 36 (3): 307-340. (Year: 2003).*
Witkowski et al., Conversion of b-ketoacyl synthase to a Malonyl Decarboxylase by replacement of the active cysteine with glutamine. Biochemistry, 1999, vol. 38: 11643-11650. (Year: 1999).*
Zheng et al., An efficient bioprocess for enzymatic production of I-menthol with high ratio of substrate to catalyst using whole cells of recombinant *E. coli*. J. Biotechnol., 2010, vol. 150: 108-114. (Year: 2010).*
Sadowski et al., The sequence-structure relationship and protein function prediction. Current Opinion in Structural Biology, 2009, vol. 19: 357-362. (Year: 2009).*
Tang et al., Identification of Dehalobacter reductive dehydrogenases that catalyse dechlorination of chloroform, 1,1,1-trichloroethane and 1,1-dichloroethane. Phil Trans R Soc B, 2013, vol. 368: 20120318, pp. 1-10. (Year: 2013).*
Office Action issued on Nov. 5, 2024, in JP Application No. 2021561569.
Extended European Search report dated Feb. 14, 2024 issued in corresponding European Patent Application No. 20893404.2.
Partial European Search Report dated Nov. 24, 2023 issued in European Patent Application No. 20893404.2.

(Continued)

*Primary Examiner* — Ganapathirama Raghu
(74) *Attorney, Agent, or Firm* — Panitch Schwarze Belisario & Nadel LLP

(57) ABSTRACT

A technique relating to a method for enzymatically producing maytansinol from an ansamitocin species, such as AP3, is provided. The method for producing maytansinol includes enzymatically producing maytansinol from an ansamitocin species with any one of various proteins.

3 Claims, 8 Drawing Sheets
Specification includes a Sequence Listing.

(56) References Cited

OTHER PUBLICATIONS

Nakahama et al., "Microbial Conversion of Ansamitocin," The Journal of Antibiotics. Vol. 34, No. 12, pp. 1581-1586 (1981).
Widdison et al., "Semisynthetic Maytansine Analogues for the Targeted Treatment of Cancer," Journal of Medicinal Chemistry, vol. 49, No. 14, pp. 4392-4408 (2006).
Higashide et al., "Ansamitocin, a group of novel maytansinoid antibiotics with antitumour properties from Nocardia," Nature, vol. 270, pp. 721-722 (1977).
International Preliminary Report on Patentability issued May 17, 2022 in International Application No. PCT/JP2020/044347.
International Search Report issued Jan. 19, 2021 in International Application No. PCT/JP2020/044347.
Moss et al., "Identification of Asm19 as an Acyltransferase Attaching the Biologically Essential Ester Side Chain of Ansamitocins Using N-Desmethyl-4,5-desepoxymaytansinol, Not Maytansinol, as Its Substrate," Journal of American Chemical Society, vol. 124, pp. 6544-6545 (2002).
Written Opinion issued Jan. 19, 2021 in International Application No. PCT/JP2020/044347.
Zock et al., "The Bacillus subtilis pnb A gene encoding p-nitrobenzyl esterase: cloning, sequence and high-level expression in *Escherichia coli*," Gene, vol. 151, pp. 37-43 (1994).
Blast Analysis: SEQ ID No. 12 vs. Streptomyces, downloaded on Mar. 5, 2025.
Additional Blast Analysis, downloaded on Mar. 5, 2025.
Spiller et al., "A structural view of evolutionary divergence," PNAS, vol. 96 No. 22, pp. 12305-12310 (1999).

\* cited by examiner

[Fig.1]
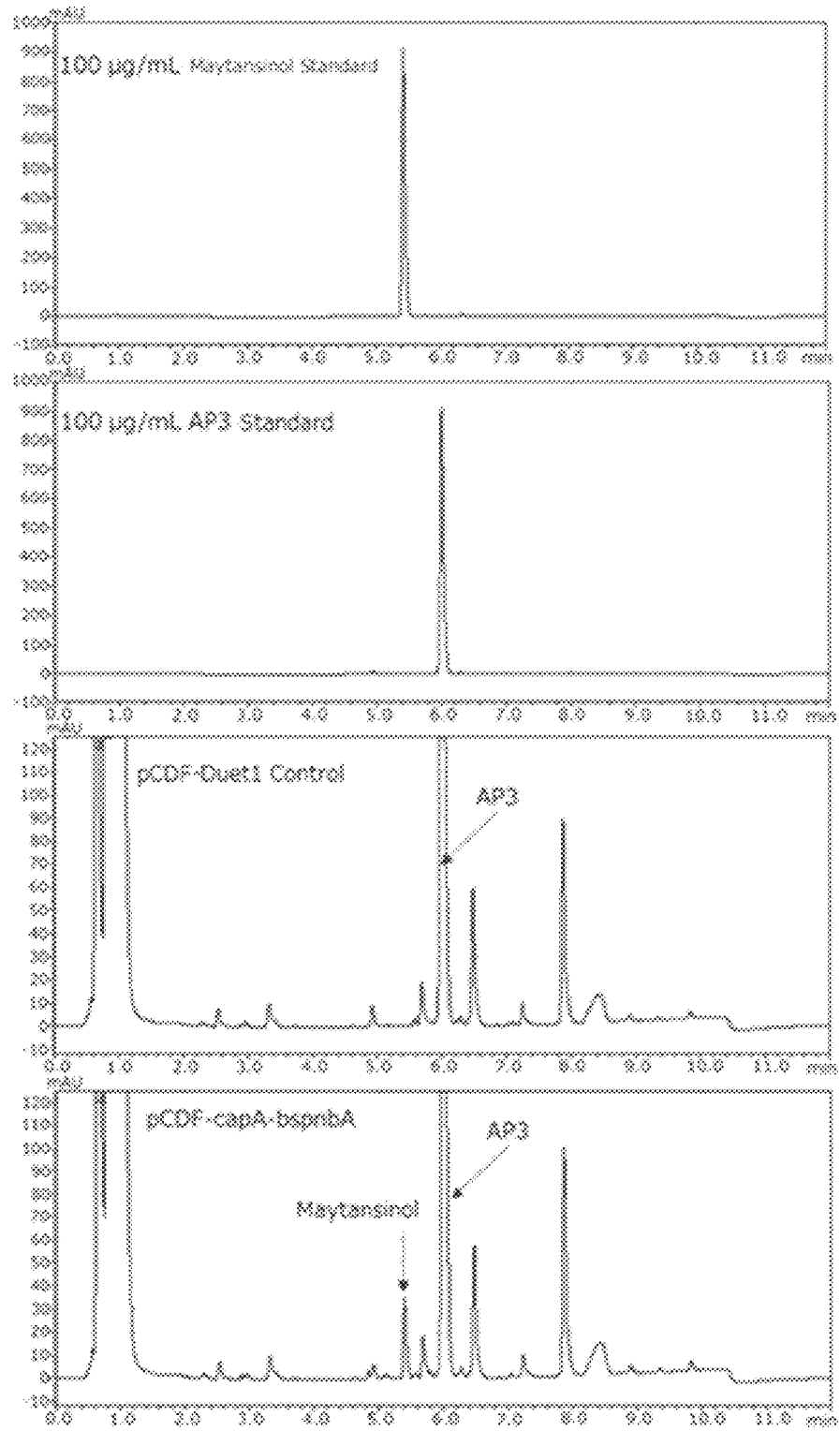

[Fig.2]

(A) Maytansinol (standard)

(B) BspnbA (WT)

[Fig.3]
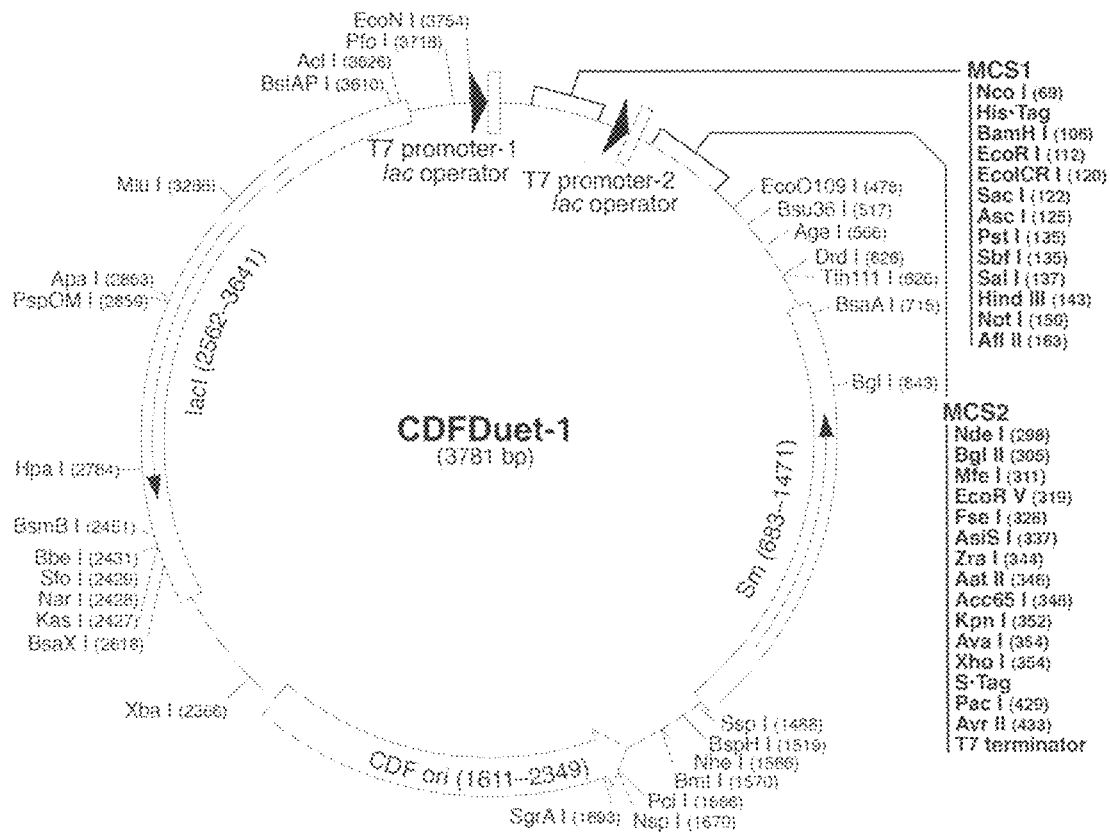
[Fig.4]
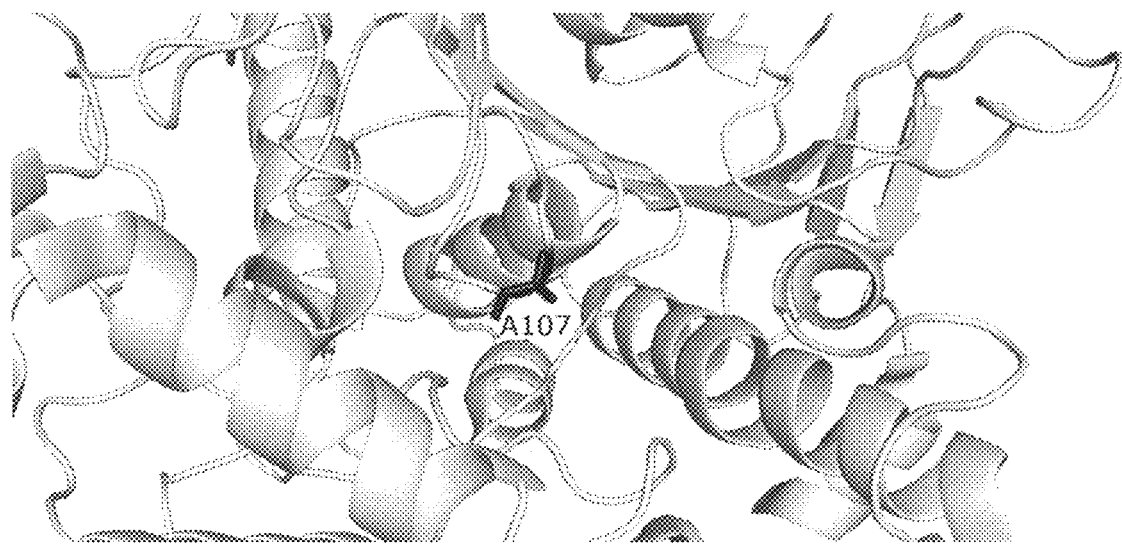

Nucleotide sequence of pnbA derived from *Bacillus subtilis* subsp. *subtilis* str168 (SEQ ID NO: 1)
atgactcatcaaatagtaacgactcaatacggcaaagtaaaaggcacaacggaaaacggcgtacata
agtggaaaggcatcccctatgccaagccgcctgtcggacaatggcgttttaaagcacctgagccgcc
tgaagtgtgggaagatgtgcttgatgccacagcgtacggctctatttgcccgcagccgtctgatttg
ctgtcactttcgtatactgagctgccccgccagtccgaggattgcttgtatgtcaatgtatttgcgc
ctgacaccccaagtaaaaatcttcctgtcatggtgtggattcacggaggcgcttttatctaggagc
gggcagtgagccattgtatgacggatcaaaacttgcggcacagggagaagtcattgtcgttacattg
aactatcggctggggccgtttggcttttgcacttgtcttcatttaatgaggcgtattctgataacc
ttgggcttttagaccaagccgccgcgctgaaatgggtgcgagagaatatttcagcgtttggcggtga
tcccgataacgtaacagtatttggagaatccgccggcgggatgagcattgccgcgctgcttgctatg
cctgcggcaaaaggcctgttccagaaagcaatcatggaaagcggcgcttctcgaacgatgacgaaag
aacaagcggcgagcacctcggcagccttttacaggtccttgggattaacgagggccaactggataa
attgcatacggtttctgcggaagatttgctaaaagcggctgatcagcttcggattgcagaaaagaa
aatatctttcagctgttcttccagcccgcccttgatccgaaaacgctgcctgaagaaccagaaaaag
cgatcgcagaaggggctgcttccggtattccgctattaattggaacaacccgtgatgaaggatattt
attttcaccccggattcagacgttcattctcaggaaacgcttgatgcagcgctcgagtatttacta
gggaagccgctggcagagaaagttgccgatttgtatccgcgttctctggaaagccaaattcatatga
tgactgatttattattttggcgccctgccgtcgcctatgcatccgcacagtctcattacgcccctgt
ctggatgtacaggttcgattggcacccgaagaagccgccgtacaataaagcgtttcacgcattagag
cttcctttgtctttggaaatctggacggattggaacgaatggcaaaagcggagattacggatgagg
tgaaacagctttctcacacgatacaatcagcgtggatcacgttcgccaaaacaggaaacccaagcac
cgaagctgtgaattggcctgcgtatcatgaagaaacgagagagacgctgattttagactcagagatt
acgatcgaaaacgatcccgaatctgaaaaaggcagaagctattcccttcaaaggagaataa

[Fig.7]

Nucleotide sequence of pnbA derived from *E. coli* (SEQ ID NO: 2)
ATGGCACATCAGATTGTTACCACACAGTATGGTAAAGTTAAAGGCACCACCGAAAATGGTGTGCATA
AATGGAAAGGTATTCCGTATGCAAAACCGCCTGTTGGTCAGTGGCGTTTTAAAGCACCGGAACCGCC
TGAAGTTTGGGAAGATGTTCTGGATGCAACCGCATATGGTAGCATTTGTCCGCAGCCGAGCGATCTG
CTGAGCCTGAGCTATACCGAACTGCCTCGTCAGAGCGAAGATTGTCTGTATGTTAATGTTTTTGCAC
CGGATACGCCGAGCAAAAATCTGCCGGTTATGGTTTGGATTCATGGTGGTGCATTTTATCTTGGTGC
AGGTAGCGAACCGCTGTATGATGGTAGCAAACTGGCAGCACAGGGTGAAGTTATTGTTGTTACCCTG
AATTATCGTCTGGGTCCGTTTGGTTTTCTGCATCTGAGCAGCTTTAATGAAGCCTATAGCGATAATC
TGGGTCTGCTGGATCAGGCAGCAGCACTGAAATGGGTTCGTGAAAACATTAGCGCATTTGGTGGTGA
TCCGGATAATGTTACCGTTTTTGGTGAAAGTGCCGGTGGTATGAGCATTGCAGCACTGCTGGCCATG
CCTGCAGCAAAAGGTCTGTTTCAGAAAGCAATTATGGAAAGCGGTGCAAGCCGTACCATGACCAAAG
AACAGGCAGCAAGTACCAGCGCAGCATTTCTGCAGGTTCTGGGTATTAATGAAGGTCAGCTGGATAA
ACTGCATACCGTTAGCGCAGAAGATTTACTGAAAGCAGCAGATCAGCTGCGTATTGCAGAAAAAGAA
AACATCTTTCAGCTGTTTTTTCAGCCTGCACTGGATCCGAAAACACTGCCGGAAGAACCGGAAAAAG
CAATTGCAGAAGGTGCAGCAAGCGGTATTCCGCTGCTGATTGGTACAACCCGTGATGAAGGTTACCT
GTTTTTTACTCCGGATAGTGATGTTCATAGCCAAGAAACCCTGGATGCAGCCCTGGAATATCTGCTG
GGTAAACCGCTGGCCGAAAAAGTTGCAGATCTGTATCCGCGTAGCCTGGAAAGCCAGATTCATATGA
TGACGGATCTGCTGTTTTGGCGTCCGGCAGTTGCATATGCCAGCGCACAGAGCCATTATGCACCGGT
TTGGATGTATCGTTTTGATTGGCATCCGAAAAAACCTCCGTATAACAAAGCATTTCATGCACTGGAA
CTGCCGTTTGTTTTTGGTAATCTGGATGGTCTGGAACGTATGGCAAAAGCAGAAATTACCGATGAAG
TTAAGCAGCTGAGCCATACCATTCAGAGCGCATGGATTACCTTTGCAAAAACCGGTAATCCGAGCAC
CGAAGCAGTTAATTGGCCTGCATATCATGAAGAAACCCGTGAAACCCTGATTCTGGATAGCGAAATT
ACCATTGAAAATGATCCGGAAAGCGAGAAACGTCAGAAACTGTTTCCGAGCAAAGGTGAATAA

[Fig.8]

Amino acid sequence of pnbA derived from *Bacillus subtilis* subsp. *subtilis* str168 (SEQ ID NO: 9)
MAHQIVTTQYGKVKGTTENGVHKWKGIPYAKPPVGQWRFKAPEPPEVWEDVLDATAYGSICPQPSDL
LSLSYTELPRQSEDCLYVNVFAPDTPSKNLPVMVWIHGGAFYLGAGSEPLYDGSKLAAQGEVIVVTL
NYRLGPFGFLHLSSFNEAYSDNLGLLDQAAALKWVRENISAFGGDPDNVTVFGESAGGMSIAALLAM
PAAKGLFQKAIMESGASRTMTKEQAASTSAAFLQVLGINEGQLDKLHTVSAEDLLKAADQLRIAEKE
NIFQLFFQPALDPKTLPEEPEKAIAEGAASGIPLLIGTTRDEGYLFFTPDSDVHSQETLDAALEYLL
GKPLAEKVADLYPRSLESQIHMMTDLLFWRPAVAYASAQSHYAPVWMYRFDWHPKKPPYNKAFHALE
LPFVFGNLDGLERMAKAEITDEVKQLSHTIQSAWITFAKTGNPSTEAVNWPAYHEETRETLILDSEI
TIENDPESEKRQKLFPSKGE

[Fig.9]

Nucleotide sequence for mutant enzyme A107G (SEQ ID NO: 10)
atgactcatcaaatagtaacgactcaatacggcaaagtaaaaggcacaacggaaaacggcgtacata
agtggaaaggcatccctatgccaagccgcctgtcggacaatggcgttttaaagcacctgagccgcc
tgaagtgtgggaagatgtgcttgatgccacagcgtacggctctatttgcccgcagccgtctgatttg
ctgtcactttcgtatactgagctgccccgccagtccgaggattgcttgtatgtcaatgtatttgcgc
ctgacaccccaagtaaaaatcttcctgtcatggtgtggattcacggaggcggnttttatctaggagc
gggcagtgagccattgtatgacggatcaaaacttgcggcacagggagaagtcattgtcgttacattg
aactatcggctggggccgtttggcttttttgcacttgtcttcatttaatgaggcgtattctgataacc
ttgggcttttagaccaagccgccgcgctgaaatgggtgcgagagaatatttcagcgtttggcggtga
tcccgataacgtaacagtatttggagaatccgccggcgggatgagcattgccgcgctgcttgctatg
cctgcggcaaaaggcctgttccagaaagcaatcatggaaagcggcgcttctcgaacgatgacgaaag
aacaagcggcgagcacctcggcagcctttttacaggtccttgggattaacgagggccaactggataa
attgcatacggtttctgcggaagatttgctaaaagcggctgatcagcttcggattgcagaaaagaa
aatatctttcagctgttcttccagcccgcccttgatccgaaaacgctgcctgaagaaccagaaaaag
cgatcgcagaaggggctgcttccggtattccgctattaattggaacaacccgtgatgaaggatattt
attttcacccggattcagacgttcattctcaggaaacgcttgatgcagcgctcgagtatttacta
gggaagccgctggcagagaaagttgccgatttgtatccgcgttctctggaaagccaaattcatatga
tgactgatttattattttggcgccctgccgtcgcctatgcatccgcacagtctcattacgcccctgt
ctggatgtacaggttcgattggcacccgaagaagccgccgtacaataaagcgtttcacgcattagag
cttccttttgtctttggaaatctggacggattggaacgaatggcaaaagcggagattacggatgagg
tgaaacagctttctcacacgatacaatcagcgtggatcacgttcgccaaaacaggaaacccaagcac
cgaagctgtgaattggcctgcgtatcatgaagaaacgagagagacgctgattttagactcagagatt
acgatcgaaaacgatcccgaatctgaaaaaaggcagaagctattcccttcaaaaggagaataa

[Fig.10]

Nucleotide sequence for mutant enzyme A107G (E. coli type) (SEQ ID NO: 11)
ATGGCACATCAGATTGTTACCACACAGTATGGTAAAGTTAAAGGCACCACCGAAAATGGTGTGCATA
AATGGAAAGGTATTCCGTATGCAAAACCGCCTGTTGGTCAGTGGCGTTTTAAAGCACCGGAACCGCC
TGAAGTTTGGGAAGATGTTCTGGATGCAACCGCATATGGTAGCATTTGTCCGCAGCCGAGCGATCTG
CTGAGCCTGAGCTATACCGAACTGCCTCGTCAGAGCGAAGATTGTCTGTATGTTAATGTTTTTGCAC
CGGATACGCCGAGCAAAAATCTGCCGGTTATGGTTTGGATTCATGGTGGTGGNTTTTATCTTGGTGC
AGGTAGCGAACCGCTGTATGATGGTAGCAAACTGGCAGCACAGGGTGAAGTTATTGTTGTTACCCTG
AATTATCGTCTGGGTCCGTTTGGTTTTCTGCATCTGAGCAGCTTTAATGAAGCCTATAGCGATAATC
TGGGTCTGCTGGATCAGGCAGCAGCACTGAAATGGGTTCGTGAAAACATTAGCGCATTTGGTGGTGA
TCCGGATAATGTTACCGTTTTTGGTGAAAGTGCCGGTGGTATGAGCATTGCAGCACTGCTGGCCATG
CCTGCAGCAAAAGGTCTGTTTCAGAAAGCAATTATGGAAAGCGGTGCAAGCCGTACCATGACCAAAG
AACAGGCAGCAAGTACCAGCGCAGCATTTCTGCAGGTTCTGGGTATTAATGAAGGTCAGCTGGATAA
ACTGCATACCGTTAGCGCAGAAGATTTACTGAAAGCAGCAGATCAGCTGCGTATTGCAGAAAAGAA
AACATCTTTCAGCTGTTTTTTCAGCCTGCACTGGATCCGAAAACACTGCCGGAAGAACCGGAAAAAG
CAATTGCAGAAGGTGCAGCAAGCGGTATTCCGCTGCTGATTGGTACAACCCGTGATGAAGGTTACCT
GTTTTTTACTCCGGATAGTGATGTTCATAGCCAAGAAACCCTGGATGCAGCCCTGGAATATCTGCTG
GGTAAACCGCTGGCCGAAAAAGTTGCAGATCTGTATCCGCGTAGCCTGGAAAGCCAGATTCATATGA
TGACGGATCTGCTGTTTTGGCGTCCGGCAGTTGCATATGCCAGCGCACAGAGCCATTATGCACCGGT
TTGGATGTATCGTTTTGATTGGCATCCGAAAAAACCTCCGTATAACAAAGCATTTCATGCACTGGAA
CTGCCGTTTGTTTTTGGTAATCTGGATGGTCTGGAACGTATGGCAAAAGCAGAAATTACCGATGAAG
TTAAGCAGCTGAGCCATACCATTCAGAGCGCATGGATTACCTTTGCAAAAACCGGTAATCCGAGCAC
CGAAGCAGTTAATTGGCCTGCATATCATGAAGAAACCCGTGAAACCCTGATTCTGGATAGCGAAATT
ACCATTGAAAATGATCCGGAAAGCGAGAAACGTCAGAAACTGTTTCCGAGCAAAGGTGAATAA

[Fig.11]

Amino acid sequence of mutant enzyme A107G (SEQ ID NO: 12)
MAHQIVTTQYGKVKGTTENGVHKWKGIPYAKPPVGQWRFKAPEPPEVWEDVLDATAYGSI
CPQPSDLLSLSYTELPRQSEDCLYVNVFAPDTPSKNLPVMVWIHGGGFYLGAGSEPLYDG
SKLAAQGEVIVVTLNYRLGPFGFLHLSSFNEAYSDNLGLLDQAAALKWVRENISAFGGDP
DNVTVFGESAGGMSIAALLAMPAAKGLFQKAIMESGASRTMTKEQAASTSAAFLQVLGIN
EGQLDKLHTVSAEDLLKAADQLRIAEKENIFQLFFQPALDPKTLPEEPEKAIAEGAASGI
PLLIGTTRDEGYLFFTPDSDVHSQETLDAALEYLLGKPLAEKVADLYPRSLESQIHMMTD
LLFWRPAVAYASAQSHYAPVWMYRFDWHPKKPPYNKAFHALELPFVFGNLDGLERMAKAE
ITDEVKQLSHTIQSAWITFAKTGNPSTEAVNWPAYHEETRETLILDSEITIENDPESEKR
QKLFPSKGE

[Fig. 12]

Amino acid sequence of mutant enzyme A3N3 (SEQ ID NO:18)
MTHKTVTTQYGKVKGTTENGVHIWKGIPYAKPPVGQLRFKAPEPPEAWENELDATAYGPICPQPSDL
LSLSYAELPRQSEDCLYVNVFAPDTPSQNLPVMVWIHGGAFYLGAGSEPLYDGSRLAAQGEVIVVTL
NYRLGPFGFLHLSSFDEAYSDNLGLLDQAAALKWVRDNISAFGGDPDNVTVFGESAGGMSIAALLAM
PAAKGLFQKAIMESGASRTMTKEKAASTAAAFLQVLGINESQLDRLHTVSAEDLLKAADQLRKAENE
NIFQLFFQPALDPKTLPAEPEKAIAEGAAAGIPLLIGTNRDEGYLFFTPDSDVHSQETLDAALEYLL
GQPLAKKAADLYPRSLESQIHMMTDLLFWRPAVAYASAQSHYAPVWMYRFDWHSDKPPYNKAFHALE
LPFVFGNLDGLERMAKAEVTDEVKQLSHTIQSAWITFAKTGNPSTEDVKWPAYHEETRQTLILDSEI
TIENDPESEKRQKLFPSQGE Amino acid sequence of mutant enzyme AN4 (SEQ ID NO:19)
MTHQIVTTQYGKVKGTTENGVHKWKGIPYAKPPVGQWRFKAPEPPEVWEDVLDATAYGPICPQPSDL
LSLSYAELPRQSEDCLYLNVFAPDTPSQNLPVMVWIHGGAFYLGAGSEPLYDGSKLAAQGEVIVVTL
NYRLGPFGFLHLSSFDEAYSDNLGLLDQAAALKWVRENISAFGGDPDNVTVFGESAGGMSIAALLAM
PAAKGLFQKAIMESGASRTMTKEQAASTAAAFLQVLGINESQLDKLHTVSAEDLLKAADQLRIAEKE
NIFQLFFQPALDPKTLPAEPEKAIAEGAASGIPLLIGTTRDEGYLFFTPDSDVHSQETLDAALEYLL
GQPLAKKAADLYPRSLESQIHMMTDLLFWRPAVAYASAQSHYAPVWMYRFDWHPKKPPYNKAFHALE
LPFVFGNLDGLERMAKAEITDEVKQLSHTIQSAWITFAKTGNPSTEAVNWPAYHEETRETLILDSEI
TIENDPDSEKRQKLFPSKGE Amino acid sequence of mutant enzyme FC15A2 (SEQ ID NO:20)
MSHKTVTTQYGKVKGTTENGVHIWKGIPYAKPPVGQLRFKAPEPPEAWENELDATAYGPICPQPSDL
LSLSYAELPRQSEDCLYLNVFAPDTPSQNLPVMVWIHGGAFYLGAGSEPLYDGSRLAAQGEVIVVTL
NYRLGPFGFLHLSSFDEAYSDNLGLLDQAAALKWVRDNISAFGGDPDNVTVFGESAGGMSIAALLAM
PAAKGLFQKAIMESGASRTMTKEKAASTAAAFLQVLGISESQLDRLHTVSAEDLLKAADQLRKAENE
NIFQLFFQPALDPKTLPAEPEKAIAEGAAAGIPLLIGTNRDEGYLFFTPDSDVHSQETLDAALEYLL
GQPLAKKAADLYPRSLESQIHMMTDLLFWRPAVAYASAQSHYAPVWMYRFDWHSDKPPYNKAFHALE
LPFVFGNLDGLERMAKAEVTDEVKQLSHTIQSAWITFAKTGNPSTEDVKWPAYDEEARKTLILDSEI
TIENDPESEKRQKLFPSQGE Amino acid sequence of mutant enzyme AN1 (SEQ ID NO:21)
MTHQIVTTQYGKVKGTTENGVHIWKGIPFAKPPVGQLRFKAPEPPEVWEGVLDATAYGPVCPQPTDL
LSLSYAELPRQSEDCLYLNVFAPDTPSQNLPVMVWIHGGAFYLGAGSDPLYDGSKLAAQGEVIVVTL
NYRLGPFGFLHLSSFDEAYSDNLGLLDQAAALKWVRENISAFGGDPDNVTVFGESAGGMSIAALLAM
PAAKGLFQKAIMESGASRTMTKEQAASTAAAFLQVLGINESQLEKLHTVSAEDLLKAADQLRIAEKE
NIFHLFFQPALDPKTLPAEPEKAIAEGAAAGIPLLIGTTRDEGYLFFTPDSDVHSQETLDAALEYLL
GQPLAKKAADLYPRSLESQIHMMTDLLFWRPAVAYASAQSHYAPVWMYRFDWHSEQPPYNKAFHALE
LPFVFGNLDGLKRMANAEVTDEVKQLSHTIQSAWITFAKTGNPSTEAVNWPAYHEETRETLIFDSEI
VIENDPDSEKRQKLFPSKGE Amino acid sequence of mutant enzyme 3rdD_EPLA7Iib_anc13 (SEQ ID NO:22)
MTELTVKTRYGALKGIAENGVHIWKGIPYAKPPVGELRFKAPEPPAPWEGVRDATAFGPVCPQPGPD
LLSMSFPLGDVPPQSEDCLYLNVFAPESEAPGKKRPVMVWIHGGAFFLGAGSEPLYDGSNLAAQGDV
IVVTLNYRLGPFGFLHLSSIGEAYSGNLGLLDQIAALKWVRDNISAFGGDPDNVTVFGESAGGMSIA
ALLAMPAAKGLFQKAILESGASQTMTAEKAADIAEAFLRELGIDTGHDLSRLHTLPAEDILKAAGKM
RKIKGENIFQLFFQPALDPATLPAEPEKAIAGGAAEGIPLLIGTNRDEGYLFFTPDSAVHSKETAAE
ALEHLLGQAGASKAADLYPHSLEGQIDMMTDLLFWRPAVAFAQAQSRHAPVWMYRFDWHLPDKPPFN
KAVHALELPFVFGNLDSLKKTLQAALTDDVKQLSRLMQSAWLAFAKTGNPSTSELQWPPYEEDKRET
LIFNTDVSVEAVHDPDSEKRRKLLHAQGE

```
                          SEQUENCE LISTING

<160> NUMBER OF SEQ ID NOS: 22

<210> SEQ ID NO 1
<211> LENGTH: 1470
<212> TYPE: DNA
<213> ORGANISM: Bacillus subtilis

<400> SEQUENCE: 1
atgactcatc aaatagtaac gactcaatac ggcaaagtaa aaggcacaac ggaaaacggc      60
gtacataagt ggaaaggcat cccctatgcc aagccgcctg tcggacaatg gcgttttaaa    120
gcacctgagc cgcctgaagt gtgggaagat gtgcttgatg ccacagcgta cggctctatt    180
tgcccgcagc cgtctgattt gctgtcactt tcgtatactg agctgccccg ccagtccgag    240
gattgcttgt atgtcaatgt atttgcgcct gacaccccaa gtaaaaatct tcctgtcatg    300
gtgtggattc acggaggcgc tttttatcta ggagcgggca gtgagccatt gtatgacgga    360
tcaaaacttg cggcacaggg agaagtcatt gtcgttacat tgaactatcg gctggggccg    420
tttggctttt tgcacttgtc ttcatttaat gaggcgtatt ctgataaccc tgggcttttca    480
```

```
gaccaagccg ccgcgctgaa atgggtgcga gagaatattt cagcgtttgg cggtgatccc      540
gataacgtaa cagtatttgg agaatccgcc ggcgggatga gcattgccgc gctgcttgct      600
atgcctgcgg caaaaggcct gttccagaaa gcaatcatgg aaagcggcgc ttctcgaacg      660
atgacgaaag aacaagcggc gagcacctcg gcagccttt tacaggtcct tgggattaac      720
gagggccaac tggataaatt gcatacggtt tctgcggaag atttgctaaa agcggctgat      780
cagcttcgga ttgcagaaaa agaaaatatc tttcagctgt tcttccagcc cgcccttgat      840
ccgaaaacgc tgcctgaaga accagaaaaa gcgatcgcag aaggggctgc ttccggtatt      900
ccgctattaa ttggaacaac ccgtgatgaa ggatatttat ttttcacccc ggattcagac      960
gttcattctc aggaaacgct tgatgcagcg ctcgagtatt tactagggaa gccgctggca     1020
gagaaagttg ccgatttgta tccgcgttct ctggaaagcc aaattcatat gatgactgat     1080
ttattatttt ggcgccctgc cgtcgcctat gcatccgcac agtctcatta cgcccctgtc     1140
tggatgtaca ggttcgattg gcacccgaag aagccgccgt acaataaagc gtttcacgca     1200
ttagagcttc cttttgtctt tggaaatctg acggattgg aacgaatggc aaaagcggag     1260
attacggatg aggtgaaaca gctttctcac acgatacaat cagcgtggat cacgttcgcc     1320
aaaacaggaa acccaagcac cgaagctgtg aattggcctg cgtatcatga agaaacgaga     1380
gagacgctga ttttagactc agagattacg atcgaaaacg atcccgaatc tgaaaaaagg     1440
cagaagctat tcccttcaaa aggagaataa                                       1470

<210> SEQ ID NO 2
<211> LENGTH: 1470
<212> TYPE: DNA
<213> ORGANISM: Artificial Sequence
<220> FEATURE:
<223> OTHER INFORMATION: pnbA_E.coli

<400> SEQUENCE: 2
atggcacatc agattgttac cacacagtat ggtaaagtta aaggcaccac cgaaaatggt       60
gtgcataaat ggaaaggtat tccgtatgca aaaccgcctg ttggtcagtg cgttttaaa      120 gcaccggaac cgcctgaagt ttgggaagat gttctggatg caaccgcata tggtagcatt      180
tgtccgcagc cgagcgatct gctgagcctg agctataccg aactgcctcg tcagagcgaa      240
gattgtctgt atgttaatgt ttttgcaccg gatacgccga gcaaaaatct gccggttatg      300
gtttggattc atggtggtgc atttatctt ggtgcaggta gcgaaccgct gtatgatggt      360
agcaaactgg cagcacaggg tgaagttatt gttgttaccc tgaattatcg tctgggtccg      420
tttggttttc tgcatctgag cagctttaat gaagcctata gcgataatct gggtctgctg      480
gatcaggcag cagcactgaa atgggttcgt gaaaacatta gcgcatttgg tggtgatccg      540
gataatgtta ccgttttgg tgaaagtgcc ggtggtatga gcattgcagc actgctggcc      600
atgcctgcag caaaaggtct gtttcagaaa gcaattatgg aaagcggtgc aagccgtacc      660
atgaccaaag aacaggcagc aagtaccagc gcagcatttc tgcaggttct gggtattaat      720
gaaggtcagc tggataaact gcataccgtt agcgcagaag atttactgaa agcagcagat      780
cagctgcgta ttgcagaaaa agaaaacatc tttcagctgt tttttcagcc tgcactggat      840
ccgaaaacac tgccggaaga accggaaaaa gcaattgcag aaggtgcagc aagcggtatt      900
ccgctgctga ttggtacaac ccgtgatgaa ggttacctgt tttttactcc ggatagtgat      960
gttcatagcc aagaaccct ggatgcagcc ctgaatatc tgctgggtaa accgctggcc     1020
gaaaaagttg cagatctgta tccgcgtagc ctggaaagcc agattcatat gatgacggat     1080
```

```
ctgctgtttt ggcgtccggc agttgcatat gccagcgcac agagccatta tgcaccggtt    1140
tggatgtatc gttttgattg gcatccgaaa aaacctccgt ataacaaagc atttcatgca    1200
ctggaactgc cgtttgtttt tggtaatctg gatggtctgg aacgtatggc aaaagcagaa    1260
attaccgatg aagttaagca gctgagccat accattcaga gcgcatggat tacctttgca    1320
aaaaccggta atccgagcac cgaagcagtt aattggcctg catatcatga agaaacccgt    1380
gaaaccctga ttctggatag cgaaattacc attgaaaatg atccggaaag cgagaaacgt    1440
cagaaactgt tccgagcaa aggtgaataa                                      1470
```

```
<210> SEQ ID NO 3
<211> LENGTH: 39
<212> TYPE: DNA
<213> ORGANISM: Artificial Sequence
<220> FEATURE:
<223> OTHER INFORMATION: FCapA-BspnbA

<400> SEQUENCE: 3
gaagcgcaag ctaacgcaca tcagattgtt accacacag                            39

<210> SEQ ID NO 4
<211> LENGTH: 40
<212> TYPE: DNA
<213> ORGANISM: Artificial Sequence
<220> FEATURE:
<223> OTHER INFORMATION: RCapA-BspnbA

<400> SEQUENCE: 4
cagactcgag ggtaccttat tcacctttgc tcggaaacag                           40

<210> SEQ ID NO 5
<211> LENGTH: 21
<212> TYPE: DNA
<213> ORGANISM: Artificial Sequence
<220> FEATURE:
<223> OTHER INFORMATION: FCapApCDFXhoI

<400> SEQUENCE: 5
ggtaccctcg agtctggtaa a                                               21

<210> SEQ ID NO 6
<211> LENGTH: 25
<212> TYPE: DNA
<213> ORGANISM: Artificial Sequence
<220> FEATURE:
<223> OTHER INFORMATION: RCapApCDFNdeI

<400> SEQUENCE: 6
gttagcttgc gcttcgttct ttttg                                           25

<210> SEQ ID NO 7
<211> LENGTH: 29
<212> TYPE: DNA
<213> ORGANISM: Artificial Sequence
<220> FEATURE:
<223> OTHER INFORMATION: FpnbA_A107X
<220> FEATURE:
<221> NAME/KEY: misc_feature
<222> LOCATION: (1)..(2)
<223> OTHER INFORMATION: n is a, c, g, or t

<400> SEQUENCE: 7
nnkttttatc ttggtgcagg tagcgaacc                                       29
```

<210> SEQ ID NO 8
<211> LENGTH: 30
<212> TYPE: DNA
<213> ORGANISM: Artificial Sequence
<220> FEATURE:
<223> OTHER INFORMATION: RpnbA_A107X

<400> SEQUENCE: 8
accaccatga atccaaacca taaccggcag					30

<210> SEQ ID NO 9
<211> LENGTH: 489
<212> TYPE: PRT
<213> ORGANISM: Bacillus subtilis

<400> SEQUENCE: 9

Met Ala His Gln Ile Val Thr Thr Gln Tyr Gly Lys Val Lys Gly Thr
1               5                   10                  15

Thr Glu Asn Gly Val His Lys Trp Lys Gly Ile Pro Tyr Ala Lys Pro
            20                  25                  30

Pro Val Gly Gln Trp Arg Phe Lys Ala Pro Glu Pro Pro Glu Val Trp
        35                  40                  45

Glu Asp Val Leu Asp Ala Thr Ala Tyr Gly Ser Ile Cys Pro Gln Pro
    50                  55                  60

Ser Asp Leu Leu Ser Leu Ser Tyr Thr Glu Leu Pro Arg Gln Ser Glu
65                  70                  75                  80

Asp Cys Leu Tyr Val Asn Val Phe Ala Pro Asp Thr Pro Ser Lys Asn
                85                  90                  95

Leu Pro Val Met Val Trp Ile His Gly Gly Ala Phe Tyr Leu Gly Ala
            100                 105                 110

Gly Ser Glu Pro Leu Tyr Asp Gly Ser Lys Leu Ala Ala Gln Gly Glu
        115                 120                 125

Val Ile Val Val Thr Leu Asn Tyr Arg Leu Gly Pro Phe Gly Phe Leu
    130                 135                 140

His Leu Ser Ser Phe Asn Glu Ala Tyr Ser Asp Asn Leu Gly Leu Leu
145                 150                 155                 160

Asp Gln Ala Ala Ala Leu Lys Trp Val Arg Glu Asn Ile Ser Ala Phe
                165                 170                 175

Gly Gly Asp Pro Asp Asn Val Thr Val Phe Gly Glu Ser Ala Gly Gly
            180                 185                 190

Met Ser Ile Ala Ala Leu Leu Ala Met Pro Ala Ala Lys Gly Leu Phe
        195                 200                 205

Gln Lys Ala Ile Met Glu Ser Gly Ala Ser Arg Thr Met Thr Lys Glu
    210                 215                 220

Gln Ala Ala Ser Thr Ser Ala Ala Phe Leu Gln Val Leu Gly Ile Asn
225                 230                 235                 240

Glu Gly Gln Leu Asp Lys Leu His Thr Val Ser Ala Glu Asp Leu Leu
                245                 250                 255

Lys Ala Ala Asp Gln Leu Arg Ile Ala Glu Lys Glu Asn Ile Phe Gln
            260                 265                 270

Leu Phe Phe Gln Pro Ala Leu Asp Pro Lys Thr Leu Pro Glu Glu Pro
        275                 280                 285

Glu Lys Ala Ile Ala Glu Gly Ala Ala Ser Gly Ile Pro Leu Leu Ile
    290                 295                 300

Gly Thr Thr Arg Asp Glu Gly Tyr Leu Phe Phe Thr Pro Asp Ser Asp
305                 310                 315                 320

Val His Ser Gln Glu Thr Leu Asp Ala Ala Leu Glu Tyr Leu Leu Gly
            325                 330                 335

Lys Pro Leu Ala Glu Lys Val Ala Asp Leu Tyr Pro Arg Ser Leu Glu
            340                 345                 350

Ser Gln Ile His Met Met Thr Asp Leu Leu Phe Trp Arg Pro Ala Val
            355                 360                 365

Ala Tyr Ala Ser Ala Gln Ser His Tyr Ala Pro Val Trp Met Tyr Arg
            370                 375                 380

Phe Asp Trp His Pro Lys Lys Pro Pro Tyr Asn Lys Ala Phe His Ala
385                 390                 395                 400

Leu Glu Leu Pro Phe Val Phe Gly Asn Leu Asp Gly Leu Glu Arg Met
            405                 410                 415

Ala Lys Ala Glu Ile Thr Asp Glu Val Lys Gln Leu Ser His Thr Ile
            420                 425                 430

Gln Ser Ala Trp Ile Thr Phe Ala Lys Thr Gly Asn Pro Ser Thr Glu
            435                 440                 445

Ala Val Asn Trp Pro Ala Tyr His Glu Glu Thr Arg Glu Thr Leu Ile
            450                 455                 460

Leu Asp Ser Glu Ile Thr Ile Glu Asn Asp Pro Glu Ser Glu Lys Arg
465                 470                 475                 480

Gln Lys Leu Phe Pro Ser Lys Gly Glu
            485

<210> SEQ ID NO 10
<211> LENGTH: 1470
<212> TYPE: DNA
<213> ORGANISM: Artificial Sequence
<220> FEATURE:
<223> OTHER INFORMATION: A107G-mutated Enzyme gene
<220> FEATURE:
<221> NAME/KEY: misc_feature
<222> LOCATION: (321)..(321)
<223> OTHER INFORMATION: n is a, c, g, or t

<400> SEQUENCE: 10
atgactcatc aaatagtaac gactcaatac ggcaaagtaa aaggcacaac ggaaaacggc      60
gtacataagt ggaaaggcat ccctatgcc aagccgcctg tcggacaatg gcgttttaaa     120
gcacctgagc cgcctgaagt gtgggaagat gtgcttgatg ccacagcgta cggctctatt     180
tgcccgcagc cgtctgattt gctgtcactt tcgtatactg agctgccccg ccagtccgag     240
gattgcttgt atgtcaatgt atttgcgcct gacaccccaa gtaaaaatct tcctgtcatg     300
gtgtggattc acggaggcgg nttttatcta ggagcgggca gtgagccatt gtatgacgga     360
tcaaaacttg cggcacaggg agaagtcatt gtcgttacat gaactatcg gctggggccg     420
tttggctttt tgcacttgtc ttcatttaat gaggcgtatt ctgataacct tgggctttta     480
gaccaagccg ccgcgctgaa atgggtgcga gagaatattt cagcgtttgg cggtgatccc     540
gataacgtaa cagtatttgg agaatccgcc ggcgggatga gcattgccgc gctgcttgct     600
atgcctgcgg caaaaggcct gttccagaaa gcaatcatgg aaagcggcgc ttctcgaacg     660
atgacgaaag aacaagcggc gagcacctcg gcagccttt tacaggtcct tgggattaac     720
gagggccaac tggataaatt gcatacggtt tctgcggaag atttgctaaa agcggctgat     780
cagcttcgga ttgcagaaaa agaaaatatc tttcagctgt tcttccagcc cgcccttgat     840
ccgaaaacgc tgcctgaaga accagaaaaa gcgatcgcag aaggggctgc ttccggtatt     900
ccgctattaa ttggaacaac ccgtgatgaa ggatatttat ttttcacccc ggattcagac     960

```
gttcattctc aggaaacgct tgatgcagcg ctcgagtatt tactagggaa gccgctggca    1020
gagaaagttg ccgatttgta tccgcgttct ctggaaagcc aaattcatat gatgactgat    1080
ttattatttt ggcgccctgc cgtcgcctat gcatccgcac agtctcatta cgcccctgtc    1140
tggatgtaca ggttcgattg gcacccgaag aagccgccgt acaataaagc gtttcacgca    1200
ttagagcttc cttttgtctt tggaaatctg gacggattgg aacgaatggc aaaagcggag    1260
attacggatg aggtgaaaca gctttctcac acgatacaat cagcgtggat cacgttcgcc    1320
aaaacaggaa acccaagcac cgaagctgtg aattggcctg cgtatcatga gaaacgaga    1380 gagacgctga ttttagactc agagattacg atcgaaaacg atcccgaatc tgaaaaaagg    1440
cagaagctat tcccttcaaa aggagaataa                                    1470
```

<210> SEQ ID NO 11
<211> LENGTH: 1470
<212> TYPE: DNA
<213> ORGANISM: Artificial Sequence
<220> FEATURE:
<223> OTHER INFORMATION: A107G-mutated gene (E.coli-type)
<220> FEATURE:
<221> NAME/KEY: misc_feature
<222> LOCATION: (321)..(321)
<223> OTHER INFORMATION: n is a, c, g, or t

<400> SEQUENCE: 11

```
atggcacatc agattgttac cacacagtat ggtaaagtta aaggcaccac cgaaaatggt     60
gtgcataaat ggaaaggtat tccgtatgca aaaccgcctg ttggtcagtg gcgttttaaa    120
gcaccggaac cgcctgaagt ttgggaagat gttctggatg caaccgcata tggtagcatt    180
tgtccgcagc cgagcgatct gctgagcctg agctataccg aactgcctcg tcagagcgaa    240
gattgtctgt atgttaatgt ttttgcaccg gatacgccga gcaaaaatct gccggttatg    300
gtttggattc atggtggtgg nttttatctt ggtgcaggta cgaaccgct gtatgatggt    360 agcaaactgg cagcacaggg tgaagttatt gttgttaccc tgaattatcg tctgggtccg    420
tttggttttc tgcatctgag cagctttaat gaagcctata gcgataatct gggtctgctg    480
gatcaggcag cagcactgaa atgggttcgt gaaaacatta gcgcatttgg tggtgatccg    540
gataatgtta ccgttttttgg tgaaagtgcc ggtggtatga gcattgcagc actgctggcc    600
atgcctgcag caaaaggtct gtttcagaaa gcaattatgg aaagcggtgc aagccgtacc    660
atgaccaaag aacaggcagc aagtaccagc gcagcatttc tgcaggttct gggtattaat    720
gaaggtcagc tggataaact gcataccgtt agcgcagaag atttactgaa agcagcagat    780
cagctgcgta ttgcagaaaa agaaaacatc tttcagctgt tttttcagcc tgcactggat    840
ccgaaaacac tgccggaaga accggaaaaa gcaattgcag aaggtgcagc aagcggtatt    900
ccgctgctga ttggtacaac ccgtgatgaa ggttacctgt tttttactcc ggatagtgat    960
gttcatagcc aagaaaccct ggatgcagcc ctggaatatc tgctgggtaa accgctggcc    1020
gaaaaagttg cagatctgta tccgcgtagc ctggaaagcc agattcatat gatgacggat    1080
ctgctgtttt ggcgtccggc agttgcatat gccagcgcac agagccatta tgcaccggtt    1140
tggatgtatc gttttgattg gcatccgaaa aaacctccgt ataacaaagc atttcatgca    1200
ctggaactgc cgtttgtttt tggtaatctg gatggtctgg aacgtatggc aaaagcagaa    1260
attaccgatg aagttaagca gctgagccat accattcaga gcgcatggat taccttttgca    1320 aaaaccggta atccgagcac cgaagcagtt aattggcctg catatcatga gaaacccgt    1380
```

-continued

```
gaaaccctga ttctggatag cgaaattacc attgaaaatg atccggaaag cgagaaacgt    1440
cagaaactgt tccgagcaa aggtgaataa                                       1470
```

<210> SEQ ID NO 12
<211> LENGTH: 489
<212> TYPE: PRT
<213> ORGANISM: Artificial Sequence
<220> FEATURE:
<223> OTHER INFORMATION: A107G-mutated Enzyme

<400> SEQUENCE: 12

```
Met Ala His Gln Ile Val Thr Thr Gln Tyr Gly Lys Val Lys Gly Thr
1               5                   10                  15

Thr Glu Asn Gly Val His Lys Trp Lys Gly Ile Pro Tyr Ala Lys Pro
            20                  25                  30

Pro Val Gly Gln Trp Arg Phe Lys Ala Pro Glu Pro Pro Glu Val Trp
        35                  40                  45

Glu Asp Val Leu Asp Ala Thr Ala Tyr Gly Ser Ile Cys Pro Gln Pro
    50                  55                  60

Ser Asp Leu Leu Ser Leu Ser Tyr Thr Glu Leu Pro Arg Gln Ser Glu
65                  70                  75                  80

Asp Cys Leu Tyr Val Asn Val Phe Ala Pro Asp Thr Pro Ser Lys Asn
                85                  90                  95

Leu Pro Val Met Val Trp Ile His Gly Gly Gly Phe Tyr Leu Gly Ala
            100                 105                 110

Gly Ser Glu Pro Leu Tyr Asp Gly Ser Lys Leu Ala Ala Gln Gly Glu
        115                 120                 125

Val Ile Val Val Thr Leu Asn Tyr Arg Leu Gly Pro Phe Gly Phe Leu
    130                 135                 140

His Leu Ser Ser Phe Asn Glu Ala Tyr Ser Asp Asn Leu Gly Leu Leu
145                 150                 155                 160

Asp Gln Ala Ala Ala Leu Lys Trp Val Arg Glu Asn Ile Ser Ala Phe
                165                 170                 175

Gly Gly Asp Pro Asp Asn Val Thr Val Phe Gly Glu Ser Ala Gly Gly
            180                 185                 190

Met Ser Ile Ala Ala Leu Leu Ala Met Pro Ala Ala Lys Gly Leu Phe
        195                 200                 205

Gln Lys Ala Ile Met Glu Ser Gly Ala Ser Arg Thr Met Thr Lys Glu
    210                 215                 220

Gln Ala Ala Ser Thr Ser Ala Ala Phe Leu Gln Val Leu Gly Ile Asn
225                 230                 235                 240

Glu Gly Gln Leu Asp Lys Leu His Thr Val Ser Ala Glu Asp Leu Leu
                245                 250                 255

Lys Ala Ala Asp Gln Leu Arg Ile Ala Glu Lys Glu Asn Ile Phe Gln
            260                 265                 270

Leu Phe Phe Gln Pro Ala Leu Asp Pro Lys Thr Leu Pro Glu Glu Pro
        275                 280                 285

Glu Lys Ala Ile Ala Glu Gly Ala Ala Ser Gly Ile Pro Leu Leu Ile
    290                 295                 300

Gly Thr Thr Arg Asp Glu Gly Tyr Leu Phe Phe Thr Pro Asp Ser Asp
305                 310                 315                 320

Val His Ser Gln Glu Thr Leu Asp Ala Ala Leu Glu Tyr Leu Leu Gly
                325                 330                 335

Lys Pro Leu Ala Glu Lys Val Ala Asp Leu Tyr Pro Arg Ser Leu Glu
            340                 345                 350
```

```
Ser Gln Ile His Met Met Thr Asp Leu Leu Phe Trp Arg Pro Ala Val
        355                 360                 365
Ala Tyr Ala Ser Ala Gln Ser His Tyr Ala Pro Val Trp Met Tyr Arg
    370                 375                 380
Phe Asp Trp His Pro Lys Lys Pro Pro Tyr Asn Lys Ala Phe His Ala
385                 390                 395                 400
Leu Glu Leu Pro Phe Val Phe Gly Asn Leu Asp Gly Leu Glu Arg Met
                405                 410                 415
Ala Lys Ala Glu Ile Thr Asp Glu Val Lys Gln Leu Ser His Thr Ile
            420                 425                 430
Gln Ser Ala Trp Ile Thr Phe Ala Lys Thr Gly Asn Pro Ser Thr Glu
        435                 440                 445
Ala Val Asn Trp Pro Ala Tyr His Glu Glu Thr Arg Glu Thr Leu Ile
    450                 455                 460
Leu Asp Ser Glu Ile Thr Ile Glu Asn Asp Pro Glu Ser Glu Lys Arg
465                 470                 475                 480
Gln Lys Leu Phe Pro Ser Lys Gly Glu
                485

<210> SEQ ID NO 13
<211> LENGTH: 30
<212> TYPE: DNA
<213> ORGANISM: Artificial Sequence
<220> FEATURE:
<223> OTHER INFORMATION: PCR primer, A3N3_Fw

<400> SEQUENCE: 13
ggagatatac catgagccac aaaacggtga                                      30

<210> SEQ ID NO 14
<211> LENGTH: 33
<212> TYPE: DNA
<213> ORGANISM: Artificial Sequence
<220> FEATURE:
<223> OTHER INFORMATION: PCR primer, A3N3_Rv

<400> SEQUENCE: 14
cgcaagcttg tcgacttatt cgccttggct cgg                                  33

<210> SEQ ID NO 15
<211> LENGTH: 3829
<212> TYPE: DNA
<213> ORGANISM: Artificial Sequence
<220> FEATURE:
<223> OTHER INFORMATION: Vector, pRSFDuet-1

<400> SEQUENCE: 15
ggggaattgt gagcggataa caattcccct gtagaaataa ttttgtttaa ctttaataag      60
gagatatacc atgggcagca gccatcacca tcatcaccac agccaggatc cgaattcgag     120
ctcggcgcgc ctgcaggtcg acaagcttgc ggccgcataa tgcttaagtc gaacagaaag     180
taatcgtatt gtacacggcc gcataatcga attaatacg actcactata ggggaattgt      240
gagcggataa caattcccca tcttagtata ttagttaagt ataagaagga gatatacata     300
tggcagatct caattggata tcggccggcc acgcgatcgc tgacgtcggt accctcgagt     360
ctggtaaaga aaccgctgct gcgaaatttg aacgccagca catggactcg tctactagcg     420
cagcttaatt aacctaggct gctgccaccg ctgagcaata actagcataa ccccttgggg     480
cctctaaacg ggtcttgagg ggttttttgc tgaaacctca ggcatttgag aagcacacgg     540
```

-continued

```
tcacactgct tccggtagtc aataaaccgg taaaccagca atagacataa gcggctattt    600
aacgaccctg ccctgaaccg acgacaagct gacgaccggg tctccgcaag tggcactttt    660
cggggaaatg tgcgcggaac ccctatttgt ttattttttct aaatacattc aaatatgtat   720
ccgctcatga attaattctt agaaaaactc atcgagcatc aaatgaaact gcaatttatt    780
catatcagga ttatcaatac catattttg aaaagccgt ttctgtaatg aaggagaaaa      840
ctcaccgagg cagttccata ggatggcaag atcctggtat cggtctgcga ttccgactcg    900
tccaacatca atacaaccta ttaatttccc ctcgtcaaaa ataaggttat caagtgagaa    960
atcaccatga gtgacgactg aatccggtga gaatggcaaa agtttatgca tttctttcca    1020
gacttgttca acaggccagc cattacgctc gtcatcaaaa tcactcgcat caaccaaacc    1080
gttattcatt cgtgattgcg cctgagcgag acgaaatacg cggtcgctgt taaaaggaca    1140
attacaaaca ggaatcgaat gcaaccggcg caggaacact gccagcgcat caacaatatt    1200
ttcacctgaa tcaggatatt cttctaatac ctggaatgct gttttcccgg ggatcgcagt    1260
ggtgagtaac catgcatcat caggagtacg gataaaatgc ttgatggtcg aagaggcat     1320 aaattccgtc agccagttta gtctgaccat ctcatctgta acatcattgg caacgctacc    1380
tttgccatgt ttcagaaaca actctggcgc atcgggcttc ccatacaatc gatagattgt    1440
cgcacctgat tgcccgacat tatcgcgagc ccatttatac ccatataaat cagcatccat    1500
gttggaattt aatcgcggcc tagagcaaga cgtttcccgt tgaatatggc tcatactctt    1560
cctttttcaa tattattgaa gcatttatca gggttattgt ctcatgagcg gatacatatt    1620
tgaatgtatt tagaaaaata acaaataggc atgcagcgc tcttccgctt cctcgctcac     1680
tgactcgcta cgctcggtcg ttcgactgcg gcgagcggtg tcagctcact caaaagcggt    1740
aatacggtta tccacagaat caggggataa agccggaaag aacatgtgag caaaaagcaa    1800
agcaccggaa gaagccaacg ccgcaggcgt ttttccatag gctccgcccc cctgacgagc    1860
atcacaaaaa tcgacgctca agccagaggt ggcgaaaccc gacaggacta taaagatacc    1920
aggcgtttcc ccctggaagc tccctcgtgc gctctcctgt tccgaccctg ccgcttaccg    1980
gatacctgtc cgcctttctc ccttcgggaa gcgtggcgct ttctcatagc tcacgctgtt    2040
ggtatctcag ttcggtgtag tcgttcgct ccaagctggg ctgtgtgcac gaaccccccg     2100
ttcagcccga ccgctgcgcc ttatccggta actatcgtct tgagtccaac ccggtaagac    2160
acgacttatc gccactggca gcagccattg gtaactgatt tagaggactt tgtcttgaag    2220
ttatgcacct gttaaggcta aactgaaaga acagattttg gtgagtgcgg tcctccaacc    2280
cacttacctt ggttcaaaga gttggtagct cagcgaacct tgagaaaacc accgttggta    2340
gcggtggttt ttctttattt atgagatgat gaatcaatcg gtctatcaag tcaacgaaca    2400
gctattccgt tactctagat ttcagtgcaa tttatctctt caaatgtagc acctgaagtc    2460
agccccatac gatataagtt gtaattctca tgttagtcat gccccgcgcc caccggaagg    2520
agctgactgg gttgaaggct ctcaagggca tcggtcgaga tcccggtgcc taatgagtga    2580
gctaacttac attaattgcg ttgcgctcac tgcccgcttt ccagtcggga aacctgtcgt    2640
gccagctgca ttaatgaatc ggccaacgcg cggggagagg cggtttgcgt attgggcgcc    2700
agggtggttt ttcttttcac cagtgagacg ggcaacagct gattgcccctt caccgcctgg   2760 ccctgagaga gttgcagcaa gcggtccacg ctggtttgcc ccagcaggcg aaaatcctgt    2820
ttgatggtgg ttaacggcgg gatataacat gagctgtctt cggtatcgtc gtatcccact    2880
```

```
accgagatgt ccgcaccaac gcgcagcccg gactcggtaa tggcgcgcat tgcgcccagc    2940
gccatctgat cgttggcaac cagcatcgca gtgggaacga tgccctcatt cagcatttgc    3000
atggtttgtt gaaaaccgga catggcactc cagtcgcctt cccgttccgc tatcggctga    3060
atttgattgc gagtgagata tttatgccag ccagccagac gcagacgcgc cgagacagaa    3120
cttaatgggc ccgctaacag cgcgatttgc tggtgaccca atgcgaccag atgctccacg    3180
cccagtcgcg taccgtcttc atgggagaaa ataatactgt tgatgggtgt ctggtcagag    3240
acatcaagaa ataacgccgg aacattagtg caggcagctt ccacagcaat ggcatcctgg    3300
tcatccagcg gatagttaat gatcagccca ctgacgcgtt gcgcgagaag attgtgcacc    3360
gccgctttac aggcttcgac gccgcttcgt tctaccatcg acaccaccac gctggcaccc    3420
agttgatcgg cgcgagattt aatcgccgcg acaatttgcg acggcgcgtg cagggccaga    3480
ctggaggtgg caacgccaat cagcaacgac tgtttgcccg ccagttgttg tgccacgcgg    3540
ttgggaatgt aattcagctc cgccatcgcc gcttccactt tttcccgcgt tttcgcagaa    3600
acgtggctgg cctggttcac cacgcgggaa acggtctgat aagagacacc ggcatactct    3660
gcgacatcgt ataacgttac tggtttcaca ttcaccaccc tgaattgact ctcttccggg    3720
cgctatcatg ccataccgcg aaaggttttg cgccattcga tggtgtccgg gatctcgacg    3780
ctctccctta tgcgactcct gcattaggaa attaatacga ctcactata               3829

<210> SEQ ID NO 16
<211> LENGTH: 27
<212> TYPE: DNA
<213> ORGANISM: Artificial Sequence
<220> FEATURE:
<223> OTHER INFORMATION: PCR primer, pRSF_Fw

<400> SEQUENCE: 16
gtcgacaagc ttgcggccgc ataatgc                                         27

<210> SEQ ID NO 17
<211> LENGTH: 45
<212> TYPE: DNA
<213> ORGANISM: Artificial Sequence
<220> FEATURE:
<223> OTHER INFORMATION: PCR primer, pRSF_Rv

<400> SEQUENCE: 17
ggtatatctc cttattaaag ttaaacaaaa ttatttctac agggg                     45

<210> SEQ ID NO 18
<211> LENGTH: 489
<212> TYPE: PRT
<213> ORGANISM: Artificial Sequence
<220> FEATURE:
<223> OTHER INFORMATION: Mutant Enzyme, A3N3

<400> SEQUENCE: 18
```

Met Ser His Lys Thr Val Thr Thr Gln Tyr Gly Lys Val Lys Gly Thr
1               5                   10                  15

Thr Glu Asn Gly Val His Ile Trp Lys Gly Ile Pro Tyr Ala Lys Pro
            20                  25                  30

Pro Val Gly Gln Leu Arg Phe Lys Ala Pro Glu Pro Pro Glu Ala Trp
        35                  40                  45

Glu Asn Glu Leu Asp Ala Thr Ala Tyr Gly Pro Ile Cys Pro Gln Pro
    50                  55                  60

Ser Asp Leu Leu Ser Leu Ser Tyr Ala Glu Leu Pro Arg Gln Ser Glu

-continued

```
            65                  70                  75                  80
Asp Cys Leu Tyr Val Asn Val Phe Ala Pro Asp Thr Pro Ser Gln Asn
                    85                  90                  95
Leu Pro Val Met Val Trp Ile His Gly Gly Ala Phe Tyr Leu Gly Ala
                    100                 105                 110
Gly Ser Glu Pro Leu Tyr Asp Gly Ser Arg Leu Ala Ala Gln Gly Glu
                    115                 120                 125
Val Ile Val Val Thr Leu Asn Tyr Arg Leu Gly Pro Phe Gly Phe Leu
        130                 135                 140
His Leu Ser Ser Phe Asp Glu Ala Tyr Ser Asp Asn Leu Gly Leu Leu
145                 150                 155                 160
Asp Gln Ala Ala Ala Leu Lys Trp Val Arg Asp Asn Ile Ser Ala Phe
                        165                 170                 175
Gly Gly Asp Pro Asp Asn Val Thr Val Phe Gly Glu Ser Ala Gly Gly
                180                 185                 190
Met Ser Ile Ala Ala Leu Leu Ala Met Pro Ala Ala Lys Gly Leu Phe
        195                 200                 205
Gln Lys Ala Ile Met Glu Ser Gly Ala Ser Arg Thr Met Thr Lys Glu
        210                 215                 220
Lys Ala Ala Ser Thr Ala Ala Ala Phe Leu Gln Val Leu Gly Ile Asn
225                 230                 235                 240
Glu Ser Gln Leu Asp Arg Leu His Thr Val Ser Ala Glu Asp Leu Leu
                    245                 250                 255
Lys Ala Ala Asp Gln Leu Arg Lys Ala Glu Asn Glu Asn Ile Phe Gln
                260                 265                 270
Leu Phe Phe Gln Pro Ala Leu Asp Pro Lys Thr Leu Pro Ala Glu Pro
            275                 280                 285
Glu Lys Ala Ile Ala Glu Gly Ala Ala Gly Ile Pro Leu Leu Ile
        290                 295                 300
Gly Thr Asn Arg Asp Glu Gly Tyr Leu Phe Phe Thr Pro Asp Ser Asp
305                 310                 315                 320
Val His Ser Gln Glu Thr Leu Asp Ala Ala Leu Glu Tyr Leu Leu Gly
                    325                 330                 335
Gln Pro Leu Ala Lys Lys Ala Ala Asp Leu Tyr Pro Arg Ser Leu Glu
                340                 345                 350
Ser Gln Ile His Met Met Thr Asp Leu Leu Phe Trp Arg Pro Ala Val
            355                 360                 365
Ala Tyr Ala Ser Ala Gln Ser His Tyr Ala Pro Val Trp Met Tyr Arg
        370                 375                 380
Phe Asp Trp His Ser Asp Lys Pro Pro Tyr Asn Lys Ala Phe His Ala
385                 390                 395                 400
Leu Glu Leu Pro Phe Val Phe Gly Asn Leu Asp Gly Leu Glu Arg Met
                    405                 410                 415
Ala Lys Ala Glu Val Thr Asp Glu Val Lys Gln Leu Ser His Thr Ile
                420                 425                 430
Gln Ser Ala Trp Ile Thr Phe Ala Lys Thr Gly Asn Pro Ser Thr Glu
            435                 440                 445
Asp Val Lys Trp Pro Ala Tyr Asp Glu Thr Arg Lys Thr Leu Ile
        450                 455                 460
Leu Asp Ser Glu Ile Thr Ile Glu Asn Asp Pro Glu Ser Glu Lys Arg
465                 470                 475                 480
Gln Lys Leu Phe Pro Ser Gln Gly Glu
            485
```

<210> SEQ ID NO 19
<211> LENGTH: 489
<212> TYPE: PRT
<213> ORGANISM: Artificial Sequence
<220> FEATURE:
<223> OTHER INFORMATION: Mutant Enzyme, AN4

<400> SEQUENCE: 19

```
Met Thr His Gln Ile Val Thr Thr Gln Tyr Gly Lys Val Lys Gly Thr
1               5                   10                  15

Thr Glu Asn Gly Val His Lys Trp Lys Gly Ile Pro Tyr Ala Lys Pro
            20                  25                  30

Pro Val Gly Gln Trp Arg Phe Lys Ala Pro Glu Pro Glu Val Trp
        35                  40                  45

Glu Asp Val Leu Asp Ala Thr Ala Tyr Gly Pro Ile Cys Pro Gln Pro
    50                  55                  60

Ser Asp Leu Leu Ser Leu Ser Tyr Ala Glu Leu Pro Arg Gln Ser Glu
65                  70                  75                  80

Asp Cys Leu Tyr Leu Asn Val Phe Ala Pro Asp Thr Pro Ser Gln Asn
                85                  90                  95

Leu Pro Val Met Val Trp Ile His Gly Gly Ala Phe Tyr Leu Gly Ala
            100                 105                 110

Gly Ser Glu Pro Leu Tyr Asp Gly Ser Lys Leu Ala Ala Gln Gly Glu
        115                 120                 125

Val Ile Val Val Thr Leu Asn Tyr Arg Leu Gly Pro Phe Gly Phe Leu
    130                 135                 140

His Leu Ser Ser Phe Asp Glu Ala Tyr Ser Asp Asn Leu Gly Leu Leu
145                 150                 155                 160

Asp Gln Ala Ala Ala Leu Lys Trp Val Arg Glu Asn Ile Ser Ala Phe
                165                 170                 175

Gly Gly Asp Pro Asp Asn Val Thr Val Phe Gly Glu Ser Ala Gly Gly
            180                 185                 190

Met Ser Ile Ala Ala Leu Leu Ala Met Pro Ala Ala Lys Gly Leu Phe
        195                 200                 205

Gln Lys Ala Ile Met Glu Ser Gly Ala Ser Arg Thr Met Thr Lys Glu
    210                 215                 220

Gln Ala Ala Ser Thr Ala Ala Phe Leu Gln Val Leu Gly Ile Asn
225                 230                 235                 240

Glu Ser Gln Leu Asp Lys Leu His Thr Val Ser Ala Glu Asp Leu Leu
                245                 250                 255

Lys Ala Ala Asp Gln Leu Arg Ile Ala Glu Lys Glu Asn Ile Phe Gln
            260                 265                 270

Leu Phe Phe Gln Pro Ala Leu Asp Pro Lys Thr Leu Pro Ala Glu Pro
        275                 280                 285

Glu Lys Ala Ile Ala Glu Gly Ala Ala Ser Gly Ile Pro Leu Leu Ile
    290                 295                 300

Gly Thr Thr Arg Asp Glu Gly Tyr Leu Phe Phe Thr Pro Asp Ser Asp
305                 310                 315                 320

Val His Ser Gln Glu Thr Leu Asp Ala Ala Leu Glu Tyr Leu Leu Gly
                325                 330                 335

Gln Pro Leu Ala Lys Lys Ala Ala Asp Leu Tyr Pro Arg Ser Leu Glu
            340                 345                 350

Ser Gln Ile His Met Met Thr Asp Leu Leu Phe Trp Arg Pro Ala Val
        355                 360                 365
```

```
Ala Tyr Ala Ser Ala Gln Ser His Tyr Ala Pro Val Trp Met Tyr Arg
        370                 375                 380

Phe Asp Trp His Pro Lys Lys Pro Pro Tyr Asn Lys Ala Phe His Ala
385                 390                 395                 400

Leu Glu Leu Pro Phe Val Phe Gly Asn Leu Asp Gly Leu Glu Arg Met
                405                 410                 415

Ala Lys Ala Glu Ile Thr Asp Glu Val Lys Gln Leu Ser His Thr Ile
            420                 425                 430

Gln Ser Ala Trp Ile Thr Phe Ala Lys Thr Gly Asn Pro Ser Thr Glu
        435                 440                 445

Ala Val Asn Trp Pro Ala Tyr His Glu Glu Thr Arg Glu Thr Leu Ile
    450                 455                 460

Leu Asp Ser Glu Ile Thr Ile Glu Asn Asp Pro Asp Ser Glu Lys Arg
465                 470                 475                 480

Gln Lys Leu Phe Pro Ser Lys Gly Glu
                485

<210> SEQ ID NO 20
<211> LENGTH: 489
<212> TYPE: PRT
<213> ORGANISM: Artificial Sequence
<220> FEATURE:
<223> OTHER INFORMATION: Mutant Enzyme, FC15A2

<400> SEQUENCE: 20

Met Ser His Lys Thr Val Thr Thr Gln Tyr Gly Lys Val Lys Gly Thr
1               5                   10                  15

Thr Glu Asn Gly Val His Ile Trp Lys Gly Ile Pro Tyr Ala Lys Pro
            20                  25                  30

Pro Val Gly Gln Leu Arg Phe Lys Ala Pro Glu Pro Pro Glu Ala Trp
        35                  40                  45

Glu Asn Glu Leu Asp Ala Thr Ala Tyr Gly Pro Ile Cys Pro Gln Pro
    50                  55                  60

Ser Asp Leu Leu Ser Leu Ser Tyr Ala Glu Leu Pro Arg Gln Ser Glu
65                  70                  75                  80

Asp Cys Leu Tyr Leu Asn Val Phe Ala Pro Asp Thr Pro Ser Gln Asn
                85                  90                  95

Leu Pro Val Met Val Trp Ile His Gly Gly Ala Phe Tyr Leu Gly Ala
            100                 105                 110

Gly Ser Glu Pro Leu Tyr Asp Gly Ser Arg Leu Ala Ala Gln Gly Glu
        115                 120                 125

Val Ile Val Val Thr Leu Asn Tyr Arg Leu Gly Pro Phe Gly Phe Leu
    130                 135                 140

His Leu Ser Ser Phe Asp Glu Ala Tyr Ser Asp Asn Leu Gly Leu Leu
145                 150                 155                 160

Asp Gln Ala Ala Ala Leu Lys Trp Val Arg Asp Asn Ile Ser Ala Phe
                165                 170                 175

Gly Gly Asp Pro Asp Asn Val Thr Val Phe Gly Glu Ser Ala Gly Gly
            180                 185                 190

Met Ser Ile Ala Ala Leu Leu Ala Met Pro Ala Ala Lys Gly Leu Phe
        195                 200                 205

Gln Lys Ala Ile Met Glu Ser Gly Ala Ser Arg Thr Met Thr Lys Glu
    210                 215                 220

Lys Ala Ala Ser Thr Ala Ala Ala Phe Leu Gln Val Leu Gly Ile Ser
225                 230                 235                 240
```

```
Glu Ser Gln Leu Asp Arg Leu His Thr Val Ser Ala Glu Asp Leu Leu
                245                 250                 255

Lys Ala Ala Asp Gln Leu Arg Lys Ala Glu Asn Glu Asn Ile Phe Gln
            260                 265                 270

Leu Phe Phe Gln Pro Ala Leu Asp Pro Lys Thr Leu Pro Ala Glu Pro
        275                 280                 285

Glu Lys Ala Ile Ala Glu Gly Ala Ala Gly Ile Pro Leu Leu Ile
290                 295                 300

Gly Thr Asn Arg Asp Glu Gly Tyr Leu Phe Phe Thr Pro Asp Ser Asp
305                 310                 315                 320

Val His Ser Gln Glu Thr Leu Asp Ala Ala Leu Glu Tyr Leu Leu Gly
                325                 330                 335

Gln Pro Leu Ala Lys Lys Ala Ala Asp Leu Tyr Pro Arg Ser Leu Glu
            340                 345                 350

Ser Gln Ile His Met Met Thr Asp Leu Leu Phe Trp Arg Pro Ala Val
        355                 360                 365

Ala Tyr Ala Ser Ala Gln Ser His Tyr Ala Pro Val Trp Met Tyr Arg
    370                 375                 380

Phe Asp Trp His Ser Asp Lys Pro Pro Tyr Asn Lys Ala Phe His Ala
385                 390                 395                 400

Leu Glu Leu Pro Phe Val Phe Gly Asn Leu Asp Gly Leu Glu Arg Met
                405                 410                 415

Ala Lys Ala Glu Val Thr Asp Glu Val Lys Gln Leu Ser His Thr Ile
            420                 425                 430

Gln Ser Ala Trp Ile Thr Phe Ala Lys Thr Gly Asn Pro Ser Thr Glu
        435                 440                 445

Asp Val Lys Trp Pro Ala Tyr Asp Glu Glu Ala Arg Lys Thr Leu Ile
    450                 455                 460

Leu Asp Ser Glu Ile Thr Ile Glu Asn Asp Pro Glu Ser Glu Lys Arg
465                 470                 475                 480

Gln Lys Leu Phe Pro Ser Gln Gly Glu
                485

<210> SEQ ID NO 21
<211> LENGTH: 489
<212> TYPE: PRT
<213> ORGANISM: Artificial Sequence
<220> FEATURE:
<223> OTHER INFORMATION: Mutant Enzyme, AN1

<400> SEQUENCE: 21

Met Thr His Gln Ile Val Thr Thr Gln Tyr Gly Lys Val Lys Gly Thr
1               5                   10                  15

Thr Glu Asn Gly Val His Ile Trp Lys Gly Ile Pro Phe Ala Lys Pro
                20                  25                  30

Pro Val Gly Gln Leu Arg Phe Lys Ala Pro Glu Pro Pro Glu Val Trp
            35                  40                  45

Glu Gly Val Leu Asp Ala Thr Ala Tyr Gly Pro Val Cys Pro Gln Pro
50                  55                  60

Thr Asp Leu Leu Ser Leu Ser Tyr Ala Glu Leu Pro Arg Gln Ser Glu
65                  70                  75                  80

Asp Cys Leu Tyr Leu Asn Val Phe Ala Pro Asp Thr Pro Ser Gln Asn
                85                  90                  95

Leu Pro Val Met Val Trp Ile His Gly Gly Ala Phe Tyr Leu Gly Ala
            100                 105                 110
```

Gly Ser Asp Pro Leu Tyr Asp Gly Ser Lys Leu Ala Ala Gln Gly Glu
            115                 120                 125

Val Ile Val Val Thr Leu Asn Tyr Arg Leu Gly Pro Phe Gly Phe Leu
        130                 135                 140

His Leu Ser Ser Phe Asp Glu Ala Tyr Ser Asp Asn Leu Gly Leu Leu
145                 150                 155                 160

Asp Gln Ala Ala Ala Leu Lys Trp Val Arg Glu Asn Ile Ser Ala Phe
                165                 170                 175

Gly Gly Asp Pro Asp Asn Val Thr Val Phe Gly Glu Ser Ala Gly Gly
            180                 185                 190

Met Ser Ile Ala Ala Leu Leu Ala Met Pro Ala Ala Lys Gly Leu Phe
        195                 200                 205

Gln Lys Ala Ile Met Glu Ser Gly Ala Ser Arg Thr Met Thr Lys Glu
    210                 215                 220

Gln Ala Ala Ser Thr Ala Ala Ala Phe Leu Gln Val Leu Gly Ile Asn
225                 230                 235                 240

Glu Ser Gln Leu Glu Lys Leu His Thr Val Ser Ala Glu Asp Leu Leu
                245                 250                 255

Lys Ala Ala Asp Gln Leu Arg Ile Ala Glu Lys Glu Asn Ile Phe His
            260                 265                 270

Leu Phe Phe Gln Pro Ala Leu Asp Pro Lys Thr Leu Pro Ala Glu Pro
        275                 280                 285

Glu Lys Ala Ile Ala Glu Gly Ala Ala Gly Ile Pro Leu Leu Ile
    290                 295                 300

Gly Thr Thr Arg Asp Glu Gly Tyr Leu Phe Phe Thr Pro Asp Ser Asp
305                 310                 315                 320

Val His Ser Gln Glu Thr Leu Asp Ala Ala Leu Glu Tyr Leu Leu Gly
                325                 330                 335

Gln Pro Leu Ala Lys Lys Ala Ala Asp Leu Tyr Pro Arg Ser Leu Glu
            340                 345                 350

Ser Gln Ile His Met Met Thr Asp Leu Leu Phe Trp Arg Pro Ala Val
        355                 360                 365

Ala Tyr Ala Ser Ala Gln Ser His Tyr Ala Pro Val Trp Met Tyr Arg
    370                 375                 380

Phe Asp Trp His Ser Glu Gln Pro Pro Tyr Asn Lys Ala Phe His Ala
385                 390                 395                 400

Leu Glu Leu Pro Phe Val Phe Gly Asn Leu Asp Gly Leu Lys Arg Met
                405                 410                 415

Ala Asn Ala Glu Val Thr Asp Glu Val Lys Gln Leu Ser His Thr Ile
            420                 425                 430

Gln Ser Ala Trp Ile Thr Phe Ala Lys Thr Gly Asn Pro Ser Thr Glu
        435                 440                 445

Ala Val Asn Trp Pro Ala Tyr His Glu Glu Thr Arg Glu Thr Leu Ile
    450                 455                 460

Phe Asp Ser Glu Ile Val Ile Glu Asn Asp Pro Asp Ser Glu Lys Arg
465                 470                 475                 480

Gln Lys Leu Phe Pro Ser Lys Gly Glu
                485

<210> SEQ ID NO 22
<211> LENGTH: 498
<212> TYPE: PRT
<213> ORGANISM: Artificial Sequence
<220> FEATURE:

<223> OTHER INFORMATION: Mutant Enzyme, 3rdD_EPLA7lib_anc13

<400> SEQUENCE: 22

```
Met Thr Glu Leu Thr Val Lys Thr Arg Tyr Gly Ala Leu Lys Gly Ile
 1               5                  10                  15

Ala Glu Asn Gly Val His Ile Trp Lys Gly Ile Pro Tyr Ala Lys Pro
            20                  25                  30

Pro Val Gly Glu Leu Arg Phe Lys Ala Pro Glu Pro Ala Pro Trp
        35                  40                  45

Glu Gly Val Arg Asp Ala Thr Ala Phe Gly Pro Val Cys Pro Gln Pro
    50                  55                  60

Gly Pro Asp Leu Leu Ser Met Ser Phe Pro Leu Gly Asp Val Pro Pro
 65                  70                  75                  80

Gln Ser Glu Asp Cys Leu Tyr Leu Asn Val Phe Ala Pro Glu Ser Glu
                85                  90                  95

Ala Pro Gly Lys Lys Arg Pro Val Met Val Trp Ile His Gly Gly Ala
            100                 105                 110

Phe Phe Leu Gly Ala Gly Ser Glu Pro Leu Tyr Asp Gly Ser Asn Leu
        115                 120                 125

Ala Ala Gln Gly Asp Val Ile Val Val Thr Leu Asn Tyr Arg Leu Gly
    130                 135                 140

Pro Phe Gly Phe Leu His Leu Ser Ser Ile Gly Glu Ala Tyr Ser Gly
145                 150                 155                 160

Asn Leu Gly Leu Leu Asp Gln Ile Ala Ala Leu Lys Trp Val Arg Asp
                165                 170                 175

Asn Ile Ser Ala Phe Gly Asp Pro Asp Asn Val Thr Val Phe Gly
            180                 185                 190

Glu Ser Ala Gly Gly Met Ser Ile Ala Ala Leu Leu Ala Met Pro Ala
    195                 200                 205

Ala Lys Gly Leu Phe Gln Lys Ala Ile Leu Glu Ser Gly Ala Ser Gln
    210                 215                 220

Thr Met Thr Ala Glu Lys Ala Ala Asp Ile Ala Glu Ala Phe Leu Arg
225                 230                 235                 240

Glu Leu Gly Ile Asp Thr Gly His Asp Leu Ser Arg Leu His Thr Leu
                245                 250                 255

Pro Ala Glu Asp Ile Leu Lys Ala Ala Gly Lys Met Arg Lys Ile Lys
            260                 265                 270

Gly Glu Asn Ile Phe Gln Leu Phe Gln Pro Ala Leu Asp Pro Ala
        275                 280                 285

Thr Leu Pro Ala Glu Pro Glu Lys Ala Ile Ala Gly Ala Ala Glu
    290                 295                 300

Gly Ile Pro Leu Leu Ile Gly Thr Asn Arg Asp Glu Gly Tyr Leu Phe
305                 310                 315                 320

Phe Thr Pro Asp Ser Ala Val His Ser Lys Glu Thr Ala Ala Glu Ala
                325                 330                 335

Leu Glu His Leu Leu Gly Gln Ala Gly Ala Ser Lys Ala Ala Asp Leu
            340                 345                 350

Tyr Pro His Ser Leu Glu Gly Gln Ile Asp Met Met Thr Asp Leu Leu
        355                 360                 365

Phe Trp Arg Pro Ala Val Ala Phe Ala Gln Ala Gln Ser Arg His Ala
    370                 375                 380

Pro Val Trp Met Tyr Arg Phe Asp Trp His Leu Pro Asp Lys Pro Pro
385                 390                 395                 400
```

-continued

```
Phe Asn Lys Ala Val His Ala Leu Glu Leu Pro Phe Val Phe Gly Asn
            405                 410                 415

Leu Asp Ser Leu Lys Lys Thr Leu Gln Ala Ala Leu Thr Asp Asp Val
        420                 425                 430

Lys Gln Leu Ser Arg Leu Met Gln Ser Ala Trp Leu Ala Phe Ala Lys
        435                 440                 445

Thr Gly Asn Pro Ser Thr Ser Glu Leu Gln Trp Pro Pro Tyr Glu Glu
    450                 455                 460

Asp Lys Arg Glu Thr Leu Ile Phe Asn Thr Asp Val Ser Val Glu Ala
465                 470                 475                 480

Val His Asp Pro Asp Ser Glu Lys Arg Arg Lys Leu Leu His Ala Gln
            485                 490                 495

Gly Glu
```

METHOD FOR ENZYMATICALLY PRODUCING MAYTANSINOL

CROSS-REFERENCE TO RELATED APPLICATIONS

This application is a Section 371 of International Application No. PCT/JP2020/044347, filed Nov. 27, 2020, which was published in the Japanese language on Jun. 3, 2021, under International Publication No. WO 2021/107133 A8, which claims priority under 35 U.S.C. § 119 (b) to Japanese Application No. 2019-217460, filed Nov. 29, 2019, the disclosure of each of which is incorporated herein by reference in its entirety.

REFERENCE TO SEQUENCE LISTING SUBMITTED ELECTRONICALLY

This application contains a sequence listing, which is submitted electronically via EFS-Web as an ASCII formatted sequence listing with a file name "688461_28US_Sequence_Listing", creation date of May 25, 2022, and having a size of 44.5 KB (45,662 bytes). The sequence listing submitted via EFS-Web is part of the specification and is herein incorporated by reference in its entirety.

TECHNICAL FIELD

The present invention relates to a method for enzymatically producing maytansinol.

BACKGROUND ART

Maytansinol is an important intermediate used in the production of maytansines such as emtansine, which are used as a drug portion of antibody-drug conjugates, and is obtained by hydrolysis of the isobutyl ester of the 3-position of ansamitocin P3 (AP3) produced by microorganisms such as *Actinosynnema pretiosum.*

As the production methods of maytansinol, chemical conversion method and microbial conversion method are known. According to the chemical conversion method, maytansinol can be obtained from an ansamitocin compound obtained by fermentation or the like by reductive cleavage using lithium trimethoxyaluminum hydride (LATH) or another alkali metal (alkali) alkoxyaluminum hydride (Patent documents 1 to 3, and Non-patent document 1). As the microbial conversion method, there is known a method for producing maytansinol comprising contacting maytanacine, maytansinol propionate or ansamitocin antibiotic with culture of a microorganism belonging to the genus *Streptomyces* or a processed product thereof having an ability to convert the acyloxy group at the 8-position of the starting material to a hydroxyl group (Patent document 4).

PRIOR ART REFERENCES

Patent Documents

Patent document 1: U.S. Pat. No. 6,333,410
Patent document 2: Japanese Patent Unexamined Publication (Kokai) No. 2004-526734
Patent document 3: Japanese Patent Unexamined Publication (Kokai) No. 2009-514978
Patent document 4: Japanese Patent Unexamined Publication (Kokai) No. Sho 55-29972.

Non-Patent Document

Non-patent document 1: Nature, 1977 Dec. 22-29; 270 (5639):721-2

SUMMARY OF THE INVENTION

Object to be Achieved by the Invention

The chemical conversion method mentioned above is not necessarily a satisfactory technique for industrialization, because LATH and its derivatives to be used are pyrophoric. In addition, as for the microbial conversion method mentioned above, the enzyme responsible for the reaction has not been identified, and it is not clear what kind of enzyme contributes to the reaction.

An object of the present invention is to provide a technique relating to a method for enzymatically producing maytansinol from an ansamitocin species such as AP3.

Means for Achieving the Object

The present invention provides the followings.

[1] A method for producing maytansinol, which comprises enzymatically producing maytansinol from an ansamitocin species with any one of the proteins (A) to (F) and (AA) to (CC) mentioned below:

(A) a protein consisting of the amino acid sequence of SEQ ID NO: 9;

(B) a protein consisting of an amino acid sequence derived from the amino acid sequence of SEQ ID NO: 9 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(C) a protein consisting of an amino acid sequence having an identity of at least 50% to the amino acid sequence of SEQ ID NO: 9, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(D) a protein consisting of the amino acid sequence of SEQ ID NO: 12;

(E) a protein consisting of an amino acid sequence derived from the amino acid sequence of SEQ ID NO:

12 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(F) a protein consisting of an amino acid sequence having an identity of at least 50% to the amino acid sequence of SEQ ID NO: 12, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(AA) a protein consisting of any one of the amino acid sequences of SEQ ID NOS: 18 to 21;

(BB) a protein consisting of an amino acid sequence derived from any one of the amino acid sequences of SEQ ID NOS: 18 to 21 by substitution, deletion, insertion, and/or addition of one or more amino acids, and having an activity for catalyzing a reaction of producing maytansinol from an ansamitocin species; and (CC) a protein consisting of an amino acid sequence having an identity of at least 80% to any one of the amino acid sequences of SEQ ID NOS: 18 to 21, and having an activity for catalyzing a reaction of producing maytansinol from an ansamitocin species.

[2] The production method according to 1, wherein the ansamitocin species is ansamitocin P2 (AP2), ansamitocin P3 (AP3), or ansamitocin P4 (AP4).

[3] The production method according to 1 or 2, wherein the ansamitocin species is AP3.

[4] A protein, which is any one of the proteins (D) to (F) and (AA) to (CC) mentioned below:

(D) a protein consisting of the amino acid sequence of SEQ ID NO: 12;

(E) a protein consisting of an amino acid sequence derived from the amino acid sequence of SEQ ID NO: 12 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(F) a protein consisting of an amino acid sequence having an identity of at least 50% to the amino acid sequence of SEQ ID NO: 12, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(AA) a protein consisting of any one of the amino acid sequences of SEQ ID NOS: 18 to 21;

(BB) a protein consisting of an amino acid sequence derived from any one of the amino acid sequences of SEQ ID NOS: 18 to 21 by substitution, deletion, insertion, and/or addition of one or more amino acids, and having an activity for catalyzing a reaction of producing maytansinol from an ansamitocin species; and (CC) a protein consisting of an amino acid sequence having an identity of at least 80% to any one of the amino acid sequences of SEQ ID NOS: 18 to 21, and having an activity for catalyzing a reaction of producing maytansinol from an ansamitocin species.

[5] A polynucleotide encoding the protein according to 4.

[6] A polynucleotide consisting of the nucleotide sequence of SEQ ID NO: 10 or 11.

[7] A bacterium transformed with a vector containing the polynucleotide according to 5 or 6.

[8] Use of any one of the proteins (A) to (F) and (AA) to (CC) mentioned below for the production of maytansinol:

(A) a protein consisting of the amino acid sequence of SEQ ID NO: 9;

(B) a protein consisting of an amino acid sequence derived from the amino acid sequence of SEQ ID NO: 9 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(C) a protein consisting of an amino acid sequence having an identity of at least 50% to the amino acid sequence of SEQ ID NO: 9, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(D) a protein consisting of the amino acid sequence of SEQ ID NO: 12;

(E) a protein consisting of an amino acid sequence derived from the amino acid sequence of SEQ ID NO: 12 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(F) a protein consisting of an amino acid sequence having an identity of at least 50% to the amino acid sequence of SEQ ID NO: 12, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(AA) a protein consisting of any one of the amino acid sequences of SEQ ID NOS: 18 to 21;

(BB) a protein consisting of an amino acid sequence derived from any one of the amino acid sequences of SEQ ID NOS: 18 to 21 by substitution, deletion, insertion, and/or addition of one or more amino acids, and having an activity for catalyzing a reaction of producing maytansinol from an ansamitocin species; and (CC) a protein consisting of an amino acid sequence having an identity of at least 80% to any one of the amino acid sequences of SEQ ID NOS: 18 to 21, and having an activity for catalyzing a reaction of producing maytansinol from an ansamitocin species.

[9] A bacterium transformed with a vector containing any one of the polynucleotides (a) to (1) and (aa) to (cc) mentioned below:

(a) a polynucleotide encoding a protein consisting of the amino acid sequence of SEQ ID NO: 9;

(b) a polynucleotide encoding a protein consisting of an amino acid sequence derived from the amino acid sequence of SEQ ID NO: 9 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(c) a polynucleotide encoding a protein consisting of an amino acid sequence having an identity of at least 50% to the amino acid sequence of SEQ ID NO: 9, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(d) a polynucleotide encoding a protein consisting of the amino acid sequence of SEQ ID NO: 12;

(e) a polynucleotide encoding a protein consisting of an amino acid sequence derived from the amino acid sequence of SEQ ID NO: 12 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(f) a polynucleotide encoding a protein consisting of an amino acid sequence having an identity of at least 50% to the amino acid sequence of SEQ ID NO: 12, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;
(g) a polynucleotide consisting of the nucleotide sequence of SEQ ID NO: 1 or 2;
(h) a polynucleotide consisting of a nucleotide sequence having an identity of at least 50% to the nucleotide sequence of SEQ ID NO: 1 or 2, and encoding a protein having an activity for catalyzing a reaction of producing maytansinol from an ansamitocin species;
(i) a polynucleotide that hybridizes with the nucleotide sequence of SEQ ID NO: 1 or 2 under stringent conditions, and encodes a protein having an activity for catalyzing a reaction of producing maytansinol from an ansamitocin species;
(j) a polynucleotide consisting of the nucleotide sequence of SEQ ID NO: 10 or 11;
(k) a polynucleotide consisting of a nucleotide sequence having an identity of at least 50% to the nucleotide sequence of SEQ ID NO: 10 or 11, wherein base of nucleotide corresponding to the position 320 is G, and encoding a protein having an activity for catalyzing a reaction of producing maytansinol from an ansamitocin species;
(l) a polynucleotide that hybridizes with the nucleotide sequence of SEQ ID NO: 10 or 11 under stringent conditions, wherein base of nucleotide corresponding to the position 320 is G, and encodes a protein having an activity for catalyzing a reaction of producing maytansinol from an ansamitocin species;
(aa) a polynucleotide encoding a protein consisting of any one of the amino acid sequences of SEQ ID NOS: 18 to 21;
(bb) a polynucleotide encoding a protein consisting of an amino acid sequence derived from any one of the amino acid sequences of SEQ ID NOS: 18 to 21 by substitution, deletion, insertion, and/or addition of one or more amino acids, and having an activity for catalyzing a reaction of producing maytansinol from an ansamitocin species; and
(cc) a polynucleotide encoding a protein consisting of an amino acid sequence having an identity of at least 80% to any one of the amino acid sequences of SEQ ID NOS: 18 to 21, and having an activity for catalyzing a reaction of producing maytansinol from an ansamitocin species.

[10] The bacterium according to 9, wherein the polynucleotides are derived from *Bacillus subtilis*.

The present invention also provides the followings.

[1] A method for producing maytansinol, which comprises the step of enzymatically producing maytansinol from an ansamitocin species with any one of the following proteins (A) to (F):
(A) a protein consisting of the amino acid sequence of SEQ ID NO: 9;
(B) a protein consisting of an amino acid sequence derived from the amino acid sequence of SEQ ID NO: 9 by substitution, deletion, insertion, and/or addition of one or more amino acids, and having an activity for catalyzing a reaction of producing maytansinol from an ansamitocin species;
(C) a protein consisting of an amino acid sequence having an identity of at least 90% to the amino acid sequence of SEQ ID NO: 9, and having an activity for catalyzing a reaction of producing maytansinol from an ansamitocin species;
(D) a protein consisting of the amino acid sequence of SEQ ID NO: 12;
(E) a protein consisting of an amino acid sequence derived from the amino acid sequence of SEQ ID NO: 12 by substitution, deletion, insertion, and/or addition of one or more amino acids, wherein amino acid corresponding to the position 107 is G, and having an activity for catalyzing a reaction of producing maytansinol from an ansamitocin species; and
(F) a protein consisting of an amino acid sequence having an identity of at least 90% to the amino acid sequence of SEQ ID NO: 12, wherein amino acid corresponding to the position 107 is G, and having an activity for catalyzing a reaction of producing maytansinol from an ansamitocin species.

[2] The production method according to 1, wherein the ansamitocin species is ansamitocin P2 (AP2), ansamitocin P3 (AP3), or ansamitocin P4 (AP4).

[3] The production method according to 1, wherein the ansamitocin species is AP3.

[4] A protein, which is any one of the proteins (D) to (F) mentioned below:
(D) a protein consisting of the amino acid sequence of SEQ ID NO: 12;
(E) a protein consisting of an amino acid sequence derived from the amino acid sequence of SEQ ID NO: 12 by substitution, deletion, insertion, and/or addition of one or more amino acids, wherein amino acid corresponding to the position 107 is G, and having an activity for catalyzing a reaction of producing maytansinol from an ansamitocin species; and
(F) a protein consisting of an amino acid sequence having an identity of at least 90% to the amino acid sequence of SEQ ID NO: 12, wherein amino acid corresponding to the position 107 is G, and having an activity for catalyzing a reaction of producing maytansinol from an ansamitocin species.

[5] A polynucleotide encoding the protein according to 4.

[6] A polynucleotide consisting of the nucleotide sequence of SEQ ID NO: 10 or 11.

[7] A bacterium transformed with a vector containing the polynucleotide according to 5 or 6.

[8] Use of any one of the proteins (A) to (F) mentioned below for the production of maytansinol:
(A) a protein consisting of the amino acid sequence of SEQ ID NO: 9;
(B) a protein consisting of an amino acid sequence derived from the amino acid sequence of SEQ ID NO: 9 by substitution, deletion, insertion, and/or addition of one or more amino acids, and having an activity for catalyzing a reaction of producing maytansinol from an ansamitocin species;
(C) a protein consisting of an amino acid sequence having an identity of at least 90% to the amino acid sequence of SEQ ID NO: 9, and having an activity for catalyzing a reaction of producing maytansinol from an ansamitocin species;
(D) a protein consisting of the amino acid sequence of SEQ ID NO: 12;
(E) a protein consisting of an amino acid sequence derived from the amino acid sequence of SEQ ID NO: 12 by substitution, deletion, insertion, and/or addition of one or more amino acids, wherein amino acid corresponding to the position 107 is G, and having an activity for catalyzing a reaction of producing maytansinol from an ansamitocin species; and
(F) a protein consisting of an amino acid sequence having an identity of at least 90% to the amino acid sequence of SEQ ID NO: 12, wherein amino acid corresponding to the position 107 is G, and having an activity for catalyzing a reaction of producing maytansinol from an ansamitocin species.

[9] A bacterium transformed with a vector containing any one of the polynucleotides (a) to (1) mentioned below:

(a) a polynucleotide encoding a protein consisting of the amino acid sequence of SEQ ID NO: 9;

(b) a polynucleotide encoding a protein consisting of an amino acid sequence derived from the amino acid sequence of SEQ ID NO: 9 by substitution, deletion, insertion, and/or addition of one or more amino acids, and having an activity for catalyzing a reaction of producing maytansinol from an ansamitocin species;

(c) a polynucleotide encoding a protein consisting of an amino acid sequence having an identity of at least 90% to the amino acid sequence of SEQ ID NO: 9, and having an activity for catalyzing a reaction of producing maytansinol from an ansamitocin species;

(d) a polynucleotide encoding a protein consisting of the amino acid sequence of SEQ ID NO: 12;

(e) a polynucleotide encoding a protein consisting of an amino acid sequence derived from the amino acid sequence of SEQ ID NO: 12 by substitution, deletion, insertion, and/or addition of one or more amino acids, wherein amino acid corresponding to the position 107 is G, and having an activity for catalyzing a reaction of producing maytansinol from an ansamitocin species;

(f) a polynucleotide encoding a protein consisting of an amino acid sequence having an identity of at least 90% to the amino acid sequence of SEQ ID NO: 12, wherein amino acid corresponding to the position 107 is G, and having an activity for catalyzing a reaction of producing maytansinol from an ansamitocin species.

(g) a polynucleotide consisting of the nucleotide sequence of SEQ ID NO: 1 or 2;

(h) a polynucleotide consisting of a nucleotide sequence having an identity of at least 90% to the nucleotide sequence of SEQ ID NO: 1 or 2, and encoding a protein having an activity for catalyzing a reaction of producing maytansinol from an ansamitocin species;

(i) a polynucleotide encoding a protein that hybridizes with the nucleotide sequence of SEQ ID NO: 1 or 2 under stringent conditions, and encodes a protein having an activity for catalyzing a reaction of producing maytansinol from an ansamitocin species;

(j) a polynucleotide consisting of the nucleotide sequence of SEQ ID NO: 10 or 11;

(k) a polynucleotide consisting of a nucleotide sequence having an identity of at least 90% to the nucleotide sequence of SEQ ID NO: 10 or 11, wherein base of nucleotide corresponding to the position 320 is G, and encoding a protein having an activity for catalyzing a reaction of producing maytansinol from an ansamitocin species; and (l) a polynucleotide that hybridizes with the nucleotide sequence of SEQ ID NO: 10 or 11 under stringent conditions, wherein base of nucleotide corresponding to the position 320 is G, and encodes a protein having an activity for catalyzing a reaction of producing maytansinol from an ansamitocin species.

[10] The bacterium according to 9, wherein the polynucleotides are derived from *Bacillus subtilis*.

BRIEF DESCRIPTION OF THE DRAWINGS

FIG. 1 Results of HPLC analysis of pCDF-capA-pnbA.

FIG. 2 Results of LC/MS analysis of AP3 reaction solution obtained by using BspnbA.

FIG. 3 Plasmid pCDFDuet-1 used.

FIG. 4 Model diagram of the active center of BspnbA (PDB:1QE3).

FIG. 5 Results of reactions performed with wild-type and A107G mutated enzyme expressing *E. coli* resting cells.

FIG. 6 Nucleotide sequence of pnbA derived from *Bacillus subtilis* subsp. *subtilis* str168 (SEQ ID NO: 1).

FIG. 7 Nucleotide sequence of pnbA *E. coli* (SEQ ID NO: 2).

FIG. 8 Amino acid sequence of pnbA derived from *Bacillus subtilis* subsp. *subtilis* str168 (SEQ ID NO: 9)

FIG. 9 Nucleotide sequence encoding A107G-mutated enzyme (SEQ ID NO: 10). This was derived from the nucleotide sequence of pnbA of *Bacillus subtilis* subsp. *subtilis* str168 (SEQ ID NO: 1) by substitution of g for c at the position 320, and substitution of n for t at the position 321. n represents t, a, g, or c.

FIG. 10 Nucleotide sequence encoding A107G-mutated enzyme (*E. coli* type, SEQ ID NO: 11). This was derived from the nucleotide sequence of pnbA_*E. coli* (SEQ ID NO: 2) by substitution of G for C at the position 320, and substitution of N for T at the position 321. N represents T, A, G, or C.

FIG. 11 Amino acid sequence of the A107G-mutated enzyme (SEQ ID NO: 12).

FIG. 12 Amino acid sequence of mutant enzyme A3N3 (SEQ ID NO: 18), amino acid sequence of mutant enzyme AN4 (SEQ ID NO: 19), amino acid sequence of mutant enzyme FC15A2 (SEQ ID NO: 20), amino acid sequence of mutant enzyme AN1 (SEQ ID NO: 21), and amino acid sequence of mutant enzyme 3rdD_EPLA7lib_anc13 (SEQ ID NO: 22).

MODES FOR CARRYING OUT THE INVENTION

[Method for Enzymatically Producing Maytansinol]

The present invention relates to a method for producing maytansinol, which comprises the step of enzymatically producing maytansinol from an ansamitocin species. The term ansamitocin species refers to compounds represented by the following formula having different ester substituents at the C3-position, wherein R is other than H (ansamitocin P0 wherein R is H is maytansinol).

[Formula 1]

|  | R |
|---|---|
| P0 | H |
| P1 | $COCH_3$ |
| P2 | $COCH_2CH_3$ |
| P3 | $COCH(CH_3)_2$ |
| P3' | $COCH_2CH_2CH_3$ |

| | |
|---|---|
| P4 | COCH$_2$CH(CH$_3$)$_2$ |
| P4' | COCH$_2$CH$_2$CH$_2$CH$_3$ |

The production method of the present invention is suitable for the production of ansamitocin C3-esters among the ansamitocin species, and it is particularly suitable for the production of ansamitocin P3 (AP3) among the ansamitocin C3-esters.

AP3 is a compound represented by the following formula.

[Formula 2]

The ansamitocin species can be microbiologically produced by conventional methods. They can also be synthesized from maytansinol by a method similar to the method of International Publication WO2014/052537 (Japanese Patent Unexamined Publication (Kohyo) No. 2016-500657, Japanese Patent No. 6517693). AP3 is commercially available as a reagent.

In this description, the present invention may be explained with reference to the production of maytansinol from AP3 among the ansamitocin species as an example, but those skilled in the art can understand the production of maytansinol from other ansamitocin species by appropriately applying the explanation to such a case.

The step of producing maytansinol from an ansamitocin species can be carried out by using any one of the following enzyme proteins (A) to (F).
(A) a protein consisting of the amino acid sequence of SEQ ID NO: 9;
(B) a protein consisting of an amino acid sequence derived from the amino acid sequence of SEQ ID NO: 9 by substitution, deletion, insertion, and/or addition of one or more amino acids, and having an activity for catalyzing a reaction of producing maytansinol from an ansamitocin species;
(C) a protein consisting of an amino acid sequence having an identity of at least 90% to the amino acid sequence of SEQ ID NO: 9, and having an activity for catalyzing a reaction of producing maytansinol from an ansamitocin species;
(D) a protein consisting of the amino acid sequence of SEQ ID NO: 12;
(E) a protein consisting of an amino acid sequence derived from the amino acid sequence of SEQ ID NO: 12 by substitution, deletion, insertion, and/or addition of one or more amino acids, wherein amino acid corresponding to the position 107 is G, and
having an activity for catalyzing a reaction of producing maytansinol from an ansamitocin species; and
(F) a protein consisting of an amino acid sequence having an identity of at least 90% to the amino acid sequence of SEQ ID NO: 12, wherein amino acid corresponding to the position 107 is G, and having an activity for catalyzing a reaction of producing maytansinol from an ansamitocin species.

The activity for catalyzing a reaction of producing maytansinol from an ansamitocin species is preferably an activity for catalyzing the reaction of producing maytansinol from AP3, and it more preferably refers to an activity for catalyzing the reaction of hydrolyzing AP3 to produce maytansinol. The presence or absence of such an activity can be confirmed by analyzing the presence or absence of maytansinol produced by the reaction or the amount thereof by HPLC or other methods.

Concerning the present invention, the expression that a certain protein has an activity for catalyzing a reaction of producing maytansinol from an ansamitocin species means at least that the protein can produce 1.0 µg/mL or more (preferably 2.0 µg/mL or more, more preferably 3.0 µg/mL or more, further preferably 4.0 µg/mL or more) of maytansinol when the protein is allowed to act on 100 µg/mL of AP3 under suitable conditions, unless especially stated. The suitable conditions are, for example, such conditions that the reaction is carried out at 20 to 30° C. and pH 3.0 to 8 for 48 hours or longer by using a sufficient amount of the enzyme.

In one embodiment of the invention, the enzyme protein to be used can be derived from a bacterium of the genus *Bacillus*, more specifically *Bacillus subtilis*, still more specifically *Bacillus subtilis* subsp. *subtilis* str168.

The nucleotide sequences of the enzymes identified by the inventors of the present invention and used in the examples described in this description are shown as SEQ ID NOS: 1 and 2, and the corresponding amino acid sequence is shown as SEQ ID NO: 9, in Sequence Listing. The sequence of SEQ ID NO: 1 is the nucleotide sequence for para-nitrobenzyl esterase (bspnbA) derived from *Bacillus subtilis* subsp. *subtilis* str168. The sequence of SEQ ID NO: 2 corresponds to the sequence of SEQ ID NO: 1 in which codons are optimized for expression in *E. coli*. The sequence identity between the sequences of SEQ ID NOS: 1 and 2 is 76%.

The protein consisting of the amino acid sequence of SEQ ID NO: 9 encoded by the nucleotide sequence of SEQ ID NO: 1 is the para-nitrobenzyl esterase (bspnbA) derived from *Bacillus subtilis* subsp. *subtilis* str168. The ability of this enzyme to convert an ansamitocin species to maytansinol was not known so far. There is not any report about finding of any specific enzyme that converts an ansamitocin species to maytansinol, and there is not any structural information based on cocrystals with similar structures, either. Thus, it is very difficult to predict the activity of bspnbA for converting an ansamitocin species to maytansinol even based on the amino acid sequence and three-dimensional structural information thereof.

According to the study of the inventors of the present invention, it was found that bspnbA used in the examples belongs to the carboxylesterase family, and has an a/β hydrolase fold. If a sequence is shown, motif analysis thereof can be appropriately performed by those skilled in the art by using software publicly opened on websites, such as Pfam in GenomeNet, and whether or not a protein has an activity for catalyzing a reaction of producing rnaytansinol using an ansamitocin species as a substrate can be appropriately assessed by those skilled in the art with reference to descriptions of this description.

According to the study of the inventors of the present invention, it is important that, in the enzyme having the amino acid sequence of SEQ ID NO: 9, amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP for maintaining the activity. Therefore, if the amino acid sequence of the rest of the sequence has an identity of at least 50% to the amino acid sequence of SEQ ID NO: 9, the protein has a necessary degree of the enzymatic activity, and can produce maytansinol from an ansamitocin species. As examples of such an enzyme, the inventors of the present invention obtained a variety of mutant enzymes listed in Table 2 mentioned in the section of Examples of this description. The identity percentages of the mutant enzymes to the sequence of SEQ ID NO: 9 are also shown in the same table. Among the mutant enzymes, the amino acid sequences of A3N3, AN4, FC15A2, AN1, and 3rdD_EPLA7lib_anc13 are shown as SEQ ID NOS: 18 to 22, respectively.

Therefore, the step of producing maytansinol from an ansamitocin species can be carried out by using any one of the enzyme proteins (B) to (F) and (AA) to (CC) mentioned below:

(B) a protein consisting of an amino acid sequence derived from the amino acid sequence of SEQ ID NO: 9 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(C) a protein consisting of an amino acid sequence having an identity of at least 50% to the amino acid sequence of SEQ ID NO: 9, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(D) a protein consisting of the amino acid sequence of SEQ ID NO: 12;

(E) a protein consisting of an amino acid sequence derived from the amino acid sequence of SEQ ID NO: 12 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(F) a protein consisting of an amino acid sequence having an identity of at least 50% to the amino acid sequence of SEQ ID NO: 12, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(AA) a protein consisting of any one of the amino acid sequences of SEQ ID NOS: 18 to 21;

(BB) a protein consisting of an amino acid sequences of SEQ ID NOS: 18 to 21 by substitution, deletion, insertion, and/or addition of one or more amino acids, and having an activity for catalyzing a reaction of producing maytansinol from an ansamitocin species; and (CC) a protein consisting of an amino acid sequence having an identity of at least 80% to any one of the amino acid sequences of SEQ ID NOS: 18 to 21, and having an activity for catalyzing a reaction of producing maytansinol from an ansamitocin species.

As for the activity of a mutant enzyme of the enzyme having the amino acid sequence of SEQ ID NO: 9, it is determined that the enzyme sufficiently has the activity (e.g., A) when a maytansinol area value equivalent to 0.3 µg/mL or more is detected in HPLC analysis conducted under the conditions described in Example 3 of this description after the conversion reaction performed at an AP3 concentration of 100 µg/mL, and such a case can be determined by distinguishing it from other cases (e.g., B).

The enzymes used in the method for producing maytansinol of the present invention can be produced from a bacterium having a polynucleotide encoding any of the enzyme proteins so that the bacterium can express the protein. Such a bacterium may be obtained by transformation as described later.

The conditions for producing maytansinol from an ansamitocin species using such an enzyme can be appropriately designed by those skilled in the art.

[Mutant bspnbA and Use of the Same]

In one embodiment of the present invention, a mutant bspnbA is used. An example of such a mutant bspnbA is the protein consisting of the amino acid sequence of SEQ ID NO: 12 used in the examples described in this description. The amino acid sequence of the mutant bspnbA of SEQ ID NO: 12 differs from the amino acid sequence of bspnbA of SEQ ID NO: 9 (wild type, WT) by one amino acid (in 489 amino acids).

Such a mutant bspnbA is novel as a protein. Therefore, the present invention also provides a protein that is any one of the proteins (D) to (F) mentioned below:

(D) a protein consisting of the amino acid sequence of SEQ ID NO: 12;

(E) a protein consisting of an amino acid sequence derived from the amino acid sequence of SEQ ID NO: 12 by substitution, deletion, insertion, and/or addition of one or more amino acids, wherein amino acid corresponding to the position 107 is G, and having an activity for catalyzing a reaction of producing maytansinol from an ansamitocin species; and (F) a protein consisting of an amino acid sequence having an identity of at least 90% to the amino acid sequence of SEQ ID NO: 12, wherein amino acid corresponding to the position 107 is G, and having an activity for catalyzing a reaction of producing maytansinol from an ansamitocin species.

The present invention also provides an enzyme protein that is any one of the proteins (E) to (F) and (AA) to (CC) mentioned below:

(E) a protein consisting of an amino acid sequence derived from the amino acid sequence of SEQ ID NO: 12 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(F) a protein consisting of an amino acid sequence having an identity of at least 50% to the amino acid sequence of SEQ ID NO: 12, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(AA) a protein consisting of any one of the amino acid sequences of SEQ ID NOS: 18 to 21;

(BB) a protein consisting of an amino acid sequence derived from any one of the amino acid sequences of SEQ ID NOS: 18 to 21 by substitution, deletion, insertion, and/or addition of one or more amino acids, and having an activity for catalyzing a reaction of producing maytansinol from an ansamitocin species; and (CC) a protein consisting of an amino acid sequence having an identity of at least 80% to any one of the amino acid sequences of SEQ ID NOS: 18 to 21, and having an activity for catalyzing a reaction of producing maytansinol from an ansamitocin species.

In the present invention, the expression that an amino acid corresponding to the position Y is a specific amino acid used for an amino acid sequence (subject amino acid sequence) having an identity to the amino acid sequence of SEQ ID NO: X means that the amino acid in the subject amino acid sequence corresponding to the amino acid at the position Y in the amino acid sequence of SEQ ID NO: X is the specific amino acid. The amino acid corresponding to the position Y refers to the amino acid in the subject amino acid sequence that corresponds to the amino acid at the position Y of the amino acid sequence of SEQ ID NO: X, when the amino acid sequence of SEQ ID NO: X and the subject amino acid sequence are aligned so that there are the largest number of positions at which the amino acids of both sequences are identical.

The present invention also provides polynucleotides encoding the proteins mentioned above, polynucleotides (SEQ ID NOS: 10 and 11) encoding the mutant bspnbA (SEQ ID NO: 12), a vector containing any of those polynucleotides, and a bacterium transformed with the vector.

[Production of Enzyme]

The enzyme used in the method for producing maytansinol from an ansamitocin species of the present invention can be produced from a bacterium having a polynucleotide encoding that enzyme protein so that the bacterium can express the protein. As such a bacterium, the present invention also provides a genetically modified bacterium that produces the enzyme.

Such a genetically modified bacterium is a bacterium transformed with a vector containing any one of the polynucleotides (a) to (1) mentioned below:

(a) a polynucleotide encoding a protein consisting of the amino acid sequence of SEQ ID NO: 9;

(b) a polynucleotide encoding a protein consisting of an amino acid sequence derived from the amino acid sequence of SEQ ID NO: 9 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(c) a polynucleotide encoding a protein consisting of an amino acid sequence having an identity of at least 50% to the amino acid sequence of SEQ ID NO: 9, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(d) a polynucleotide encoding a protein consisting of the amino acid sequence of SEQ ID NO: 12;

(e) a polynucleotide encoding a protein consisting of an amino acid sequence derived from the amino acid sequence of SEQ ID NO: 12 by substitution, deletion, insertion, and/or addition of one or more amino acids, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(f) a polynucleotide encoding a protein consisting of an amino acid sequence having an identity of at least 50% to the amino acid sequence of SEQ ID NO: 12, wherein:

amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 323 are HSX or ASX (where X is Q, K, E, or M), amino acids corresponding to the positions 374 to 376 are QSX (where X is H, R, D, or Q), and amino acids corresponding to the positions 443 to 445 are GNP, and having an activity for catalyzing a reaction of producing maytansinol from an ansamitocin species;

(g) a polynucleotide consisting of the nucleotide sequence of SEQ ID NO: 1 or 2;

(h) a polynucleotide consisting of a nucleotide sequence having an identity of at least 50% to the nucleotide sequence of SEQ ID NO: 1 or 2, and encoding a protein having an activity for catalyzing a reaction of producing maytansinol from an ansamitocin species;

(i) a polynucleotide that hybridizes with the nucleotide sequence of SEQ ID NO: 1 or 2 under stringent conditions, and encodes a protein having an activity for catalyzing a reaction of producing maytansinol from an ansamitocin species;

(j) a polynucleotide consisting of the nucleotide sequence of SEQ ID NO: 10 or 11;

(k) a polynucleotide consisting of a nucleotide sequence having an identity of at least 50% to the nucleotide sequence of SEQ ID NO: 10 or 11, wherein base of nucleotide corresponding to the position 320 is G, and encoding a protein having an activity for catalyzing a reaction of producing maytansinol from an ansamitocin species;

(l) a polynucleotide that hybridizes with the nucleotide sequence of SEQ ID NO: 10 or 11 under stringent conditions, wherein base of nucleotide corresponding to the position 320 is G, and encodes a protein having an activity for catalyzing a reaction of producing maytansinol from an ansamitocin species;

(aa) a polynucleotide encoding a protein consisting of any one of the amino acid sequences of SEQ ID NOS: 18 to 21;

(bb) a polynucleotide encoding a protein consisting of an amino acid sequence derived from any one of the amino acid sequences of SEQ ID NOS: 18 to 21 by substitution, deletion, insertion, and/or addition of one or more amino acids, and having an activity for catalyzing a reaction of producing maytansinol from an ansamitocin species; and (cc) a polynucleotide encoding a protein consisting of an amino acid sequence having an identity of at least 80% to any one of the amino acid sequences of SEQ ID NOS: 18 to 21, and having an activity for catalyzing a reaction of producing maytansinol from an ansamitocin species.

One group of the preferred examples of the polynucleotides mentioned above consists of those derived from *Bacillus subtilis*.

As a bacterium to be transformed (host), any microorganism that can incorporate a target DNA and produce a target enzyme protein can be used without any particular restriction. Examples of the bacterium to be transformed include bacteria belonging to the phylum Proteobacteria (also referred to simply as Proteobacteria). Proteobacteria include bacteria belonging to the class Alphaproteobacteria, Betaproteobacteria, Gammaproteobacteria, Deltaproteobacteria, Epsilonproteobacteria, Zetaproteobacteria, or Oligoflexus. Among these, one example of such a bacterium to be preferably used for the present invention is a bacterium belonging to the class Gammaproteobacteria (also referred to simply as Gammaproteobacteria), more specifically *Escherichia coli*. Various strains belonging to *Escherichia coli* can be used for the present invention. Preferred examples of such strains include *E. coli* BL21 (DE3), and so forth.

Means for incorporating a foreign polynucleotide into a host and making the host express it are not particularly limited, and such operation can be performed by using, for example, the methods described in Molecular Cloning: A Laboratory Manual, 2nd ed., Current Protocols in Molecular Biology (edited by Frederick M., Ausubel et al., 1987). The host and plasmid vector system is not particularly limited as long as it is such a system that the target polynucleotide can be stably retained and expressed in the host. The plasmid may also contain an autonomous replication sequence, promoter sequence, terminator sequence, drug resistance gene, and so forth in addition to the target polynucleotide, and as for the type of the plasmid, the plasmid may be not only an autonomously replicable plasmid, but also an integrative plasmid having a sequence homologous to a certain region of the genome of the host to be used. The site for incorporation of the target polynucleotide may be either on the plasmid or on the genome of the host microorganism.

In the case of using *E. coli* as the host, examples of the autonomously replicable vector include pUC19, pRSFDuet-1, etc., examples of the promoter sequence include lac, T7, etc., examples of the terminator sequence include lacZ terminator, T7 terminator, etc., and examples of the drug resistance gene include ampicillin resistance gene, kanamycin resistance gene, etc.

The conditions for the production of the enzyme by the transformed bacterium can be appropriately designed by those skilled in the art according to the type of the bacterium to be used. When *E. coli* is used as the host, the bacterial cells can be grown by inoculating an appropriate amount of the microorganism into a commonly used medium containing an antibiotic as a selection marker, and performing culture at 20 to 40° C. for 6 to 72 hours, preferably 9 to 60 hours, more preferably 12 to 48 hours, if necessary, with stirring or shaking at 100 to 400 rpm. The target substance can be obtained in the culture medium by, if necessary, supplying an appropriate inducer (e.g., isopropylthio-β-galactoside (IPTG)), further performing culture at 20 to 40° C. for 3 to 72 hours, preferably 4 to 60 hours, more preferably 6 to 48 hours, if necessary, with stirring or shaking the culture medium at 100 to 400 rpm. The endpoint of the culture can be appropriately determined by those skilled in the art, taking into account the production amount of the target substance, and so forth.

According to a preferred embodiment of the present invention, a transformed *E. coli* is provided. A preferred example of the transformed *E. coli* is one having an ability to produce 1 sg or more of maytansinol per 1 mL of culture medium.

[Identity of Nucleotide or Amino Acid Sequence]

Concerning the expression that a polynucleotide "hybridizes under stringent conditions" used in connection with the present invention, the hybridization conditions can be appropriately selected depending on the polynucleotide to be obtained for any polynucleotide according to the descriptions of Molecular Cloning: A Laboratory Manual, 4th ed. (Sambrook et al., Cold Spring Harbor Laboratory Press) and Hybridization of Nucleic Acid Immobilization on Solid Supports (ANALYTICAL BIOCHEMISTRY, 138, 267-284 (1984)), unless especially noted. For example, when a DNA having an identity of 50% or higher is to be obtained, hybridization can be performed at 40° C. in SSC solution at 6-fold concentration (SSC solution at 1-fold concentration contains 150 mM sodium chloride and 15 mM sodium citrate solution) in the presence of 5% formamide, and then the filter can be washed at 49° C. with SSC solution at 4-fold concentration. When a DNA having an identity of 85% or higher is to be obtained, hybridization can be performed at 40° C. in SSC solution at 2-fold concentration in the presence of 50% formamide, and then the filter can be washed at 57° C. with SSC solution at 0.1-fold concentration. When a DNA having an identity of 90% or higher is to be obtained, hybridization can be performed at 45° C. in SSC solution at 2-fold concentration in the presence of 50% formamide, and then the filter can be washed at 62° C. with SSC solution at 0.1-fold concentration.

As for the expression of "an amino acid sequence derived by substitution, deletion, insertion, and/or addition of one or more amino acids" used for a protein or amino acid sequence in the present invention, the number of amino acids substituted or the like is not limited for any protein, unless especially stated, so long as the protein having the amino acid sequence has a desired function, but it may be about 1 to 250, 1 to 200, 1 to 150, 1 to 100, 1 to 50, 1 to 40, 1 to 30, 1 to 20, 1 to 15, 1 to 9, or 1 to 4, or in the case of substitution of amino acids of similar properties, a further larger number of amino acids may be substituted or the like. Means for preparing polynucleotides for such amino acid sequences and such proteins are well known to those skilled in the art.

In the explanations of the present invention, as for amino acids or amino acid residues, A stands for alanine, C for cysteine, D for aspartic acid, E for glutamic acid, F for phenylalanine, G for glycine, H for histidine, I for isoleucine, K for lysine, L for leucine, M for methionine, N for asparagine, P for proline, Q for glutamine, R for arginine, S for serine, T for threonine, U for selenocysteine(3), V for valine, W for tryptophan, and Y for tyrosine.

Concerning the present invention, the term "identity" used for nucleotide sequences (also referred to as base sequence) or amino acid sequence means percentage of the number of identical nucleotides or amino acids of two sequences determined by aligning the two sequences in an optimal manner for any nucleotide sequence or amino acid sequence, unless especially stated. It can be calculated in accordance with the equation: Identity=(Number of matching positions/Total number of positions)×100, and can be calculated by using a commercially available algorithm. Such an algorithm is also incorporated into the NBLAST and XBLAST programs described in Altschul et al., J. Mol. Biol., 215 (1990) 403-410. In more detail, the search and analysis for nucleotide or amino acid sequence identity can be performed with algorithms or programs well known to those skilled in the art (e.g., BLASTN, BLASTP, BLASTX, ClustalW, etc.). When such a program is used, parameters for it can be appropriately set by those skilled in the art, or default parameters of each program can be used. The specific procedures for these analysis methods are also well known to those skilled in the art. Genetic information processing software GENETYX (registered trademark, Genetyx Corporation) may be used for calculating the identity. If the sequence for which the % identity is to be calculated has an additional sequence that does not exist in the sequence to be compared, such as a tag sequence, such an additional sequence is not included in the calculation of the % identity.

Concerning the present invention, identity for a nucleotide sequence or an amino acid sequence is sequence identity of at least 50%, for example, 60% or higher, 70% or higher, preferably 80% or higher, more preferably 85% or higher, further preferably 90% or higher, further preferably 95% or higher, further preferably 97.5% or higher, further preferably 99% or higher, for any case, unless especially stated.

The polynucleotides or genes, and proteins or enzymes used in the present invention can be prepared by those skilled in the art using conventional techniques.

EXAMPLES

Hereafter, the present invention will be specifically explained with reference to examples, but is not limited by them.

Example 1: Cloning of AP3 Esterase

By referring to databases, a nucleotide sequence of para-nitrobenzyl esterase (bspnbA) derived from *Bacillus subtilis* subsp. *subtilis* str168 (SEQ ID NO: 1) was artificially synthesized (GenScript Inc.) as a sequence in which codons were optimized for expression in *E. coli* (SEQ ID NO: 2). The sequence was amplified by PCR using primers FCapA-BspnbA and RCapA-BspnbA (SEQ ID NOS: 3 and 4). Similarly, the pCDF-capA vector (FIG. 3, a vector derived from pCDFDuet-1 by cloning the CapA family protein [*Bacillus*] at the multi-cloning site thereof, amino acid sequence WP_013082012.1) was amplified by PCR using primers FCapApCDFXhoI and RCapApCDFNdeI (SEQ ID NOS: 5 and 6). The resulting 2 fragments were cloned by using In-Fusion Kit (TAKARA).

The *E. coli* JM109 (TAKARA) was transformed with the resulting In-Fusion solution, and incubated overnight. By performing colony PCR for the resulting colonies, plasmid containing the insert was searched for to prepare a plasmid. The obtained plasmid was designated as pCDF-capA-bspnbA.

Example 2: BspnbA Activity Evaluation Test

*E. coli* BL21 (DE3) (Nippon Gene Co., Ltd.) was transformed with pRSF-bspnbA (obtained by cloning the sequence of SEQ ID NO: 2 into the multi-cloning site of pRSFDuet-1), and pCDF-capA-bspnbA, and the resulting colonies were each inoculated into the M9 seed liquid medium (0.68% $Na_2HPO_4$, 0.3% $KH_2PO_4$, 0.1% $NH_4Cl$, 0.05% NaCl, 1.0% casamino acid, 0.002% thymine, 0.1 mM $CaCl_2$), 0.4% D-glucose, 1.0 mM $MgCl_2$) containing kanamycin sulfate (25 µg/mL) and streptomycin sulfate (10 µg/mL), and cultured at 28° C. for 20 hours with shaking at 220 rpm.

The culture medium was added to the M9 main medium (0.68% $Na_2HPO_4$, 0.3% $KH_2PO_4$, 0.1% $NH_4Cl$, 0.05% NaCl, 1.0% casamino acid, 0.002% thymine, 0.1 mM $CaCl_2$) containing kanamycin sulfate (25 µg/mL) and Overnight Express AutoInduction Systems (Merck), and culture was performed at 28° C. for 6 hours with shaking at 220 rpm. Then, IPTG was added at a final concentration of 1 mM, and culture was performed at 28° C. for about 16 hours with shaking at 220 rpm. The cells were collected by centrifugation of 0.5 mL of the resulting culture medium, the supernatant was discarded, then 10 mM Tris-HCl and 100

µg/mL of AP3 (dissolved in acetonitrile) were added as final concentrations, and the conversion reaction was allowed at 30° C. and 220 rpm. After 24 to 96 hours, an equal volume of acetone was added, the mixture was stirred for 10 minute, and then centrifuged, and the supernatant was subjected to HPLC analysis.

Example 3: HPLC Analysis

The analysis conditions are described below.
Analytical instrument: SHIMADZU Nexera XR
Column used: Imtakt Unison UK-C8 (50×3 mm)
Eluent A: 5 mM $HCOONH_4$ (0.02% HCOOH)
Eluent B: MeCN (0.02% HCOOH)
Separation conditions: 0 to 9 minutes (3 to 90% of B), 9 to 9.50 minutes (90% of B),
9.51 to 12 minutes (3% of B), 12.01 minutes (stop)
Flow rate: 0.7 mL/minute
Injection volume: 10 µL
Column temperature: 40° C.

Figure 2:
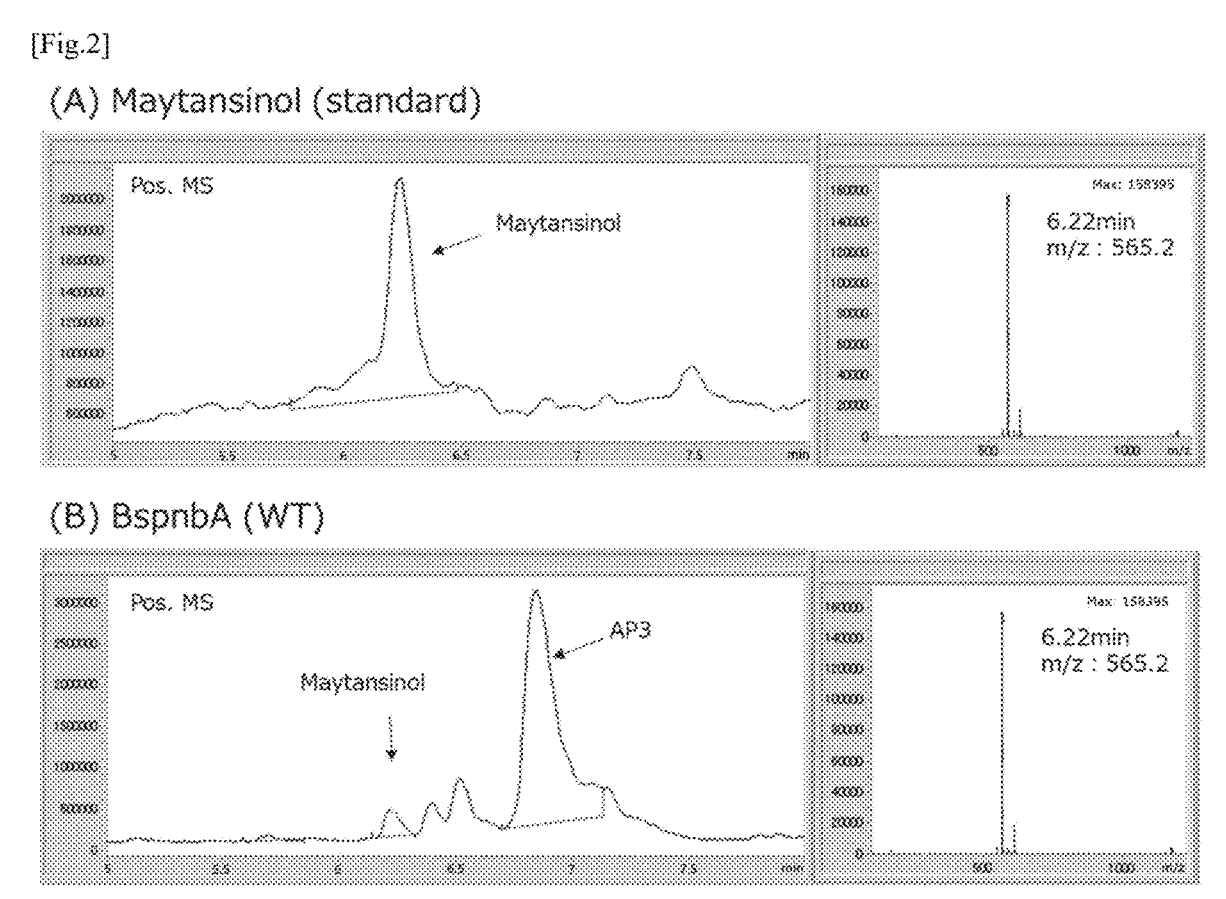

HPLC and LC/MS charts are shown in FIGS. 1 and 2, respectively. With the empty vector, pCDF-Duet1 (FIG. 3), maytansinol was not produced, whereas with pCDF-capA-bspnbA, a peak was detected at the same retention time as that of maytansinol (FIG. 1). In addition, the results of LC/MS of this product were consistent with that of the positive MS of maytansinol (FIG. 2), and therefore it was concluded that the pnb esterase is an enzyme that catalyzes the reaction to convert AP3 into maytansinol.

There is not any report about finding of any specific enzyme that converts AP3 to maytansinol, and there is not any structural information based on cocrystals with similar structures, either. Thus, it is extremely difficult to predict the activity of this enzyme even based on the amino acid sequence and three-dimensional structural information thereof.

According to the study of the inventors of the present invention, a peak of maytansinol could be similarly detected by HPLC when AP2 was used instead of AP3. In addition, it can be easily analogized that the pnb esterase also acts on AP4 (isobutyl ester) in the same way as that for AP2 (ethyl ester) and AP3 (isopropyl ester). Therefore, the pnb esterase is an enzyme that catalyzes the reaction that converts various ansamitocin species to maytansinol.

Example 4: Screening for High Activation by Site-Directed Saturation Mutagenesis Although the enzyme was not purified in the activity evaluations of Examples 2 and 3, and standardization was not performed for protein concentration or bacterial growth rate, either, it was assumed that the activity of this enzyme for AP3 could be further enhanced, therefore saturation mutation was site-specifically introduced into the active center of bspnbA, and a highly active enzyme was screened for. The mutation site is shown in FIG. 4.

Mutant enzyme library fragments were amplified by inverse PCR using primers FpnbA_A107X and RpnbA_A107X (SEQ ID NOS: 7 and 8) and pCDF-capA-bspnbA as the template, cyclized by using T4 kinase (Toyobo) and Ligation high (Toyobo), and used to transform *E. coli* JM109 (TAKARA), and the bacteria were incubated overnight at 37° C. All the obtained colonies were suspended in the LB liquid medium and collected, and the plasmids were extracted from them to construct a mutant enzyme library. It was introduced into *E. coli* BL21(DE3) according to the method of Example 2, and 93 clones were inoculated into the M9 seed liquid medium containing streptomycin sulfate (10 μg/mL) contained in wells of a 96-deep well plate, and cultured at 30° C. for 20 hours with shaking at 800 rpm. The culture medium was added to the M9 main medium (0.68% $Na_2HPO_4$, 0.3% $KH_2PO_4$, 0.1% $NH_4Cl$, 0.05% NaCl, 1.0% casamino acid, 0.002% thymine, 0.1 mM $CaCl_2$) containing streptomycin sulfate (10 μg/mL) and Overnight Express AutoInduction Systems (Merck), and culture was performed at 30° C. for 6 hours with shaking at 800 rpm. Then, IPTG was added at a final concentration of 10 mM, and culture was performed at 30° C. for 24 hours with shaking at 800 rpm. The cells were collected by centrifugation of the resulting culture medium, the supernatant was discarded, then 10 mM Tris-HCl and 100 μg/mL AP3 (dissolved in acetonitrile) were added as final concentrations, and the conversion reaction was allowed at 37° C. and 800 rpm. After 24 hours, an equal volume of acetone was added, the mixture was stirred for 10 minute, and then centrifuged, and the supernatant was subjected to HPLC analysis.

Example 5: Results of Screening

As for the analytical conditions, see Example 3. As a result of this test, A107G mutant enzyme of which AP3 conversion activity was increased by about 5 times compared with that of the wild-type esterase was obtained (FIG. 5)

Example 6: Evaluation of Designed Enzymes

In the same manner as that of Example 1, a designed enzyme A3N3 gene was artificially synthesized in a sequence in which codons were optimized for expression in *E. coli* (GENEWIZ), and amplified by PCR using primers A3N3_Fw and A3N3_Rv (SEQ ID NOS: 13 and 14). Similarly, pRSFDuet-1 vector (SEQ ID NO: 15) was amplified by PCR using primers pRSF_Fw and pRSF_Rv (SEQ ID NOS: 16 and 17). The resulting two fragments were cloned by using In-Fusion kit of TAKARA. Genes for the other mutant enzymes were prepared in the same manner.

The obtained In-Fusion solution was used for introduction into *E. coli* BL21(DE3) according to the method of Example 2, the obtained clones were inoculated into 2 mL of the M9 seed medium (14-mL test tubes) and pre-cultured overnight at 28° C. and 220 rpm. The culture medium was added to 10 mL of the M9 main medium (0.68% $Na_2HPO_4$, 0.3% $KH_2PO_4$, 0.1% $NH_4Cl$, 0.05% NaCl, 1.0% casamino acid, 0.002% thymine, 0.1 mM $CaCl_2$) containing kanamycin sulfate (25 μg/mL) and Overnight Express Autoinduction System 1 (Merck), and culture was performed at 28° C. for 6 hours with shaking at 220 rpm. Then, IPTG was added at a final concentration of 100 μM, and culture was performed at 28° C. for 12 hours with shaking at 220 rpm. The cells were collected by centrifugation of 1 mL of the resulting culture medium, the supernatant was discarded, then 250 μL of 50 mM Tris-HCl containing 100 mg/L of AP3 as the substrate was added, the cells were suspended on a vortex mixer, and the conversion reaction was allowed at 37° C. and 220 rpm. After 24 hours, an equal volume of acetone was added, the mixture was stirred for 10 minute, and then centrifuged, and the supernatant was subjected to HPLC analysis.

The conversion reaction was carried out at an AP3 concentration of 100 g/mL, and HPLC analysis was performed under the conditions described in Example 3. When a maytansinol area corresponding to 0.3 μg/mL or more was detected, the result was represented as A (there was sufficient activity), and the other results were represented as B. The parts considered to relate to the activity (positions corresponding to positions of the SEQ ID NO: 9, secondary structure) and the results of this test are summarized in the tables mentioned below, together with the % identities to the sequence of the SEQ ID NO: 9. The secondary structure is based on the information of BspnbA (PDB: 1QE3).

TABLE 1

| | I | II | III |
|---|---|---|---|
| Positions | Amino acids corresponding to positions 139-141 are GPF | Amino acids corresponding to positions 66-68 are DLL or AGA | Amino acids corresponding to positions 247-249 are LHT |
| Secondary structure | Center of α4 Helix | α-Helix | α10Helix |

| | IV | V | VI | VII |
|---|---|---|---|---|
| | Amino acids corresponding to positions 322-324 are H/ASX (Q/K/E/M) | Amino acids corresponding to positions 374-376 are QSX (H/R/D/Q) | Amino acids corresponding to positions 443-445 are GNP | Amino acids corresponding to positions 146-148 are LSS/P |
| | α14Helix | Rear part of α18Helix | End of α20Helix | None |

TABLE 2

| | Sequence code | Activity | I | II | III | IV | V | VI | VII | Identity | SEQ ID NO: |
|---|---|---|---|---|---|---|---|---|---|---|---|
| | BsPnbA | A | DLL | GPF | LSS | LHT | HSQ | QSH | GNP | — | 9 |
| 1 | A3N3 | A | DLL | GPF | LSS | LHT | HSQ | QSH | GNP | 93.0 | 18 |
| 2 | FC15A2 | A | DLL | GPF | LSS | LHT | HSQ | QSH | GNP | 92.4 | |
| 3 | A3N4 | A | DLL | GPF | LSS | LHT | HSQ | QSH | GNP | 93.5 | |
| 4 | AN4 | A | DLL | GPF | LSS | LHT | HSQ | QSH | GNP | 97.5 | 19 |
| 5 | A3N6 | A | DLL | GPF | LSS | LHT | HSQ | QSH | GNP | 96.5 | |
| 6 | FC15A1 | A | DLL | GPF | LSS | LHT | HSQ | QSH | GNP | 98.0 | |
| 7 | FC35A1A2 | A | DLL | GPF | LSS | LHT | HSQ | QSH | GNP | 95.9 | 20 |
| 8 | AN1 | A | DLL | GPF | LSS | LHT | HSQ | QSH | GNP | 93.9 | 21 |
| 9 | A3N25 | A | DLL | GPF | LSS | LHT | HSQ | QSD | GNP | 90.8 | |
| 10 | A3N31 | A | DLL | GPF | LSS | LHT | HSQ | QSR | GNP | 84.2 | |
| 11 | 3rdD_EPLA71ib_ancl3 | A | DLL | GPF | LSS | LHT | HSK | QSR | GNP | 70.3 | 22 |
| 12 | N5_71ibFastML | A | DLL | GPF | LSS | LHT | HSQ | QSR | GNP | 70.1 | |
| 13 | 3rdD_EPLA71ib_ancl4 | A | DLL | GPF | LSS | LHT | HSK | QSR | GNP | 59.3 | |
| 14 | N6_71ibFasML | A | DLL | GPF | LSS | LHT | HSK | QSR | GNP | 59.3 | |
| 15 | Icl112011487_71ib | A | DLL | GPF | LSS | LHT | HSE | QSR | GNP | 61.0 | |
| 16 | Icl112021487_71ib | A | DLL | GPF | LSS | LHT | HSK | QSQ | GNP | 60.8 | |
| 17 | EPMAlibseq_delete3ib_withA3N25_ancd19 | A | AGA | GPF | LSS | LHT | ASQ | QSR | GNP | 53.7 | |
| 18 | EPMA12lib_A3N25_A3N31_anc22 | A | AGA | GPF | LSP | LHT | ASM | QSR | GNP | 50.3 | |
| 19 | 3rdD_EPLA71ib_anc9 | B | ESM | GPL | LAP | LRT | MNK | QAR | GNP | 58.9 | |
| 20 | N1_71ibFastML | B | ESM | GPL | LAP | LRT | MNK | QAR | GNP | 58.3 | |
| 21 | N2_71ibFastML | B | ESM | GPL | LAP | LRT | MNK | QAR | GNP | 55.2 | |
| 22 | N3_71ibFastML | B | ESM | GPL | LTP | LFT | MNK | QAV | GKP | 46.0 | |
| 23 | AN15 | B | TSG | GPL | LSP | LHT | ESF | QLD | GDP | 45.2 | |

TABLE 2-continued

|  | Sequence code | Activity | I | II | III | IV | V | VI | VII | Identity | SEQ ID NO: |
|---|---|---|---|---|---|---|---|---|---|---|---|
| 24 | BN12 | B | LSG | GPL | LSS | LHT | ETL | QSD | GDP | 65.2 | |
| 25 | BN1 | B | MYT | GAL | LSS | LMT | PIT | HSAH | GVP | 32.5 | |
| 26 | BN2 | B | MYT | GAL | LSS | LMT | PTT | HSAH | GVP | 32.5 | |
| 27 | BN7 | B | MYT | GAL | LSS | VMA | PMT | HSR | GVP | 31.5 | |
| 28 | BN10 | B | LYT | GAL | LSS | LLR | PVD | HGA | GVP | 30.7 | |
| 29 | BN11 | B | MYT | GAL | LSS | LLR | PTT | HGA | GVP | 30.3 | |
| 30 | 3rdD_EPMA121ib_anc22 | B | AGG | GPF | LSS | LHT | ASQ | QSR | GNP | 52.1 | |
| 31 | N9_12libFastML | B | SGG | GPF | LSS | LHT | HSQ | QSR | GNP | 52.6 | |
| 32 | 3rdD_EVLS141ib_anc24 | B | DLL | NVF | LAD | LLT | GEQ | QVE | GNP | 38.9 | |
| 33 | EVLS14lib_withA3N25_31_anc27 | B | DLL | NVF | LAD | LLT | GEQ | QAE | GNP | 36.4 | |
| 34 | EVLS14libwithA3N25_anc16 | B | DLL | NVF | LAD | LLT | GEQ | QAE | GNP | 39.5 | |

A3N3, AN4, FC15A2, AN1, and 3rdD_EPLA7lib_anc13 had particularly high activity.

SEQ ID NO: 1, Nucleotide sequence of pnbA derived from *Bacillus subtilis* subsp. *subtilis* str168
SEQ ID NO: 2, Nucleotide sequence of pnbA *E. coli*
SEQ ID NO: 3, PCR primer, FCapA-BspnbA
SEQ ID NO: 4, PCR primer, RCapA-BspnbA
SEQ ID NO: 5, PCR primer, FCapApCDFXhoI
SEQ ID NO: 6, PCR primer, RCapApCDFNdeI
SEQ ID NO: 7, PCR primer, FpnbA_A107X
SEQ ID NO: 8, PCR primer, RpnbA_A107X
SEQ ID NO: 9, Amino acid sequence of pnbA
SEQ ID NO: 10, Nucleotide sequence for A107G mutant enzyme
SEQ ID NO: 11, Nucleotide sequence for A107G mutant enzyme (*E. coli* type)
SEQ ID NO: 12, Amino acid sequence of A107G mutant enzyme
SEQ ID NO: 13, PCR primer, A3N3_Fw
SEQ ID NO: 14, PCR primer, A3N3_Rv
SEQ ID NO: 15, Vector, pRSFDuet-1
SEQ ID NO: 16, PCR primer, pRSF_Fw
SEQ ID NO: 17, PCR primer, pRSF_Rv
SEQ ID NO: 18, Amino acid sequence of mutant enzyme A3N3
SEQ ID NO: 19, Amino acid sequence of mutant enzyme AN4
SEQ ID NO: 20, Amino acid sequence of mutant enzyme FC15A2
SEQ ID NO: 21, Amino acid sequence of mutant enzyme AN1
SEQ ID NO: 22, Amino acid sequence of mutant enzyme 3rdD_EPLA7lib_anc13

The invention claimed is:

1. A method for producing maytansinol, which comprises enzymatically producing maytansinol from an ansamitocin species with:
(i) a protein consisting of the amino acid sequence of SEQ ID NO: 12; or
(ii) a protein consisting of an amino acid sequence having an identity of at least 90% to the amino acid sequence of SEQ ID NO: 12, wherein:
amino acids corresponding to the positions 66 to 68 are DLL or AGA, amino acids corresponding to the positions 139 to 141 are GPF, amino acids corresponding to the positions 146 to 148 are LSS or LSP, amino acids corresponding to the positions 247 to 249 are LHT, amino acids corresponding to the position 322 to 324 are HSX or ASX (where X is Q, K, E, or M), amino acids corresponding to the positions 374 to 376 are QSX (where X is H, R, D, or Q), and amino acids corresponding to the positions 443 to 445 are GNP, and
having an activity for catalyzing a reaction of producing maytansinol from an ansamitocin species; and
wherein the protein (i) or (ii) is heterologously expressed.

2. The production method according to claim 1, wherein the ansamitocin species is ansamitocin P2 (AP2), ansamitocin P3 (AP3), or ansamitocin P4 (AP4).

3. The production method according to claim 1, wherein the ansamitocin species is AP3.

* * * * *